US006838978B2

(12) United States Patent
Aizu et al.

(10) Patent No.: US 6,838,978 B2
(45) Date of Patent: Jan. 4, 2005

(54) APPLIANCE DATA COLLECTING SYSTEM

(75) Inventors: Kazuhiro Aizu, Neyagawa (JP);
Yasuyuki Shintani, Nishinomiya (JP);
Takashi Murakami, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 168 days.

(21) Appl. No.: 10/338,903

(22) Filed: Jan. 9, 2003

(65) Prior Publication Data

US 2003/0131156 A1 Jul. 10, 2003

(30) Foreign Application Priority Data

Jan. 9, 2002 (JP) ........................................ 2002-001991

(51) Int. Cl.[7] .......................... G08B 9/00; H04M 11/04; G05B 11/01
(52) U.S. Cl. ............................. 340/286.02; 340/310.01; 340/310.06; 340/310.08; 700/17; 700/18; 700/22; 700/23; 700/24
(58) Field of Search .................. 340/310.01, 310.08, 340/310.06, 286.02; 375/257; 333/7, 100, 24 R; 700/9, 10, 17, 18, 22, 23, 24

(56) References Cited

U.S. PATENT DOCUMENTS 4,644,320 A * 2/1987 Carr et al. ............. 340/310.06
5,835,005 A * 11/1998 Furukawa et al. ...... 340/310.01
6,437,686 B2 * 8/2002 Satoh et al. ............ 340/310.01
6,577,231 B2 * 6/2003 Litwin et al. .......... 340/310.01
6,587,739 B1 * 7/2003 Abrams et al. ................ 700/83

FOREIGN PATENT DOCUMENTS

| JP | 07-312649 | 11/1995 |
| JP | 09-071219 | 3/1997 |
| JP | 10-271572 | 10/1998 |

* cited by examiner

Primary Examiner—Jeffery Hofsass
Assistant Examiner—Lam Pham
(74) Attorney, Agent, or Firm—Wenderoth, Lind & Ponack, L.L.P.

(57) ABSTRACT

A controller (1) holds appliance data acquired from an appliance (3) regularly and without loss. A display terminal (2) is capable of moving to other rooms through a receptacle and holds the appliance data acquired from the appliance (3). When there is loss in the appliance data for a part of time period because of a move and the like, the display terminal (2) executes acquisition request to the controller (1) to acquire this non-collected data of the appliance. The controller (1) transmits the appliance data to the display terminal (2) in response to the request of the display terminal (2). The display terminal (2) acquires (or complements) the non-collected data from the controller (1) and display the data.

21 Claims, 31 Drawing Sheets

Fg.2

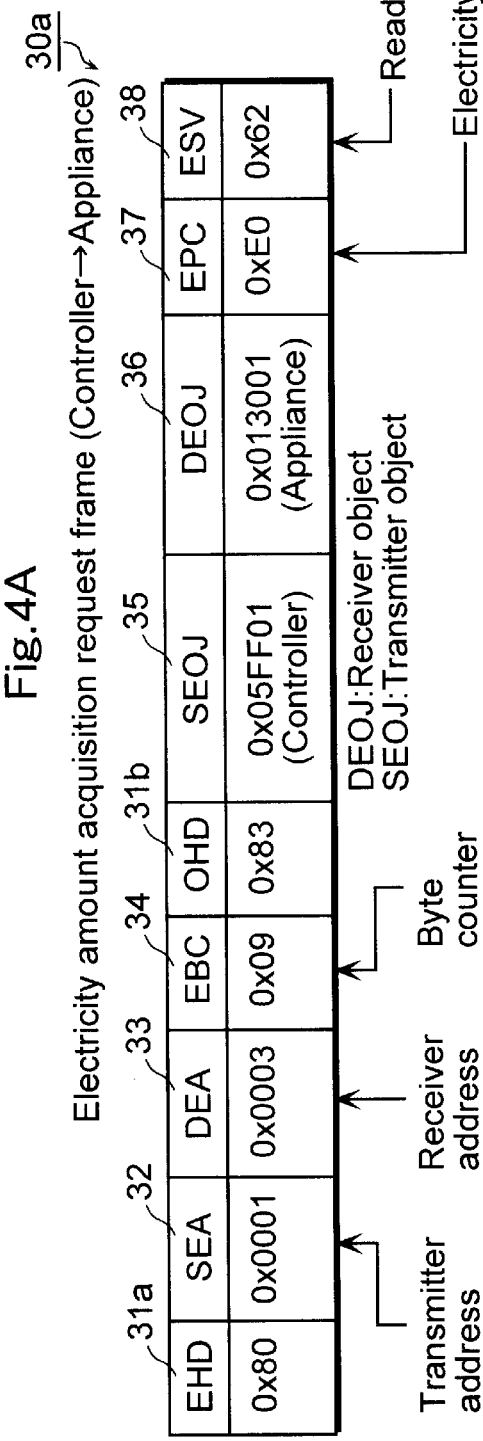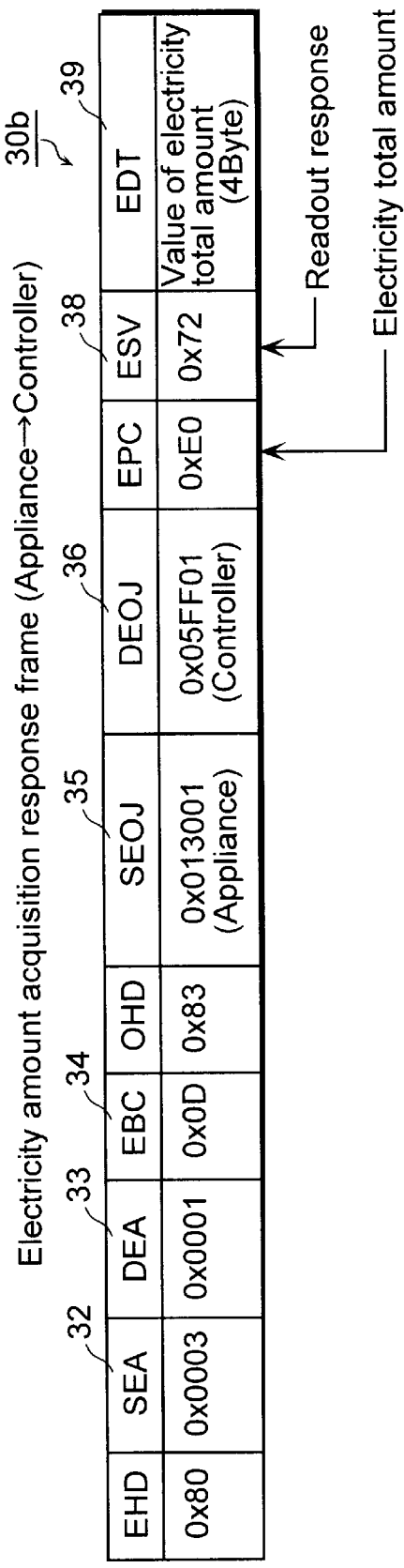

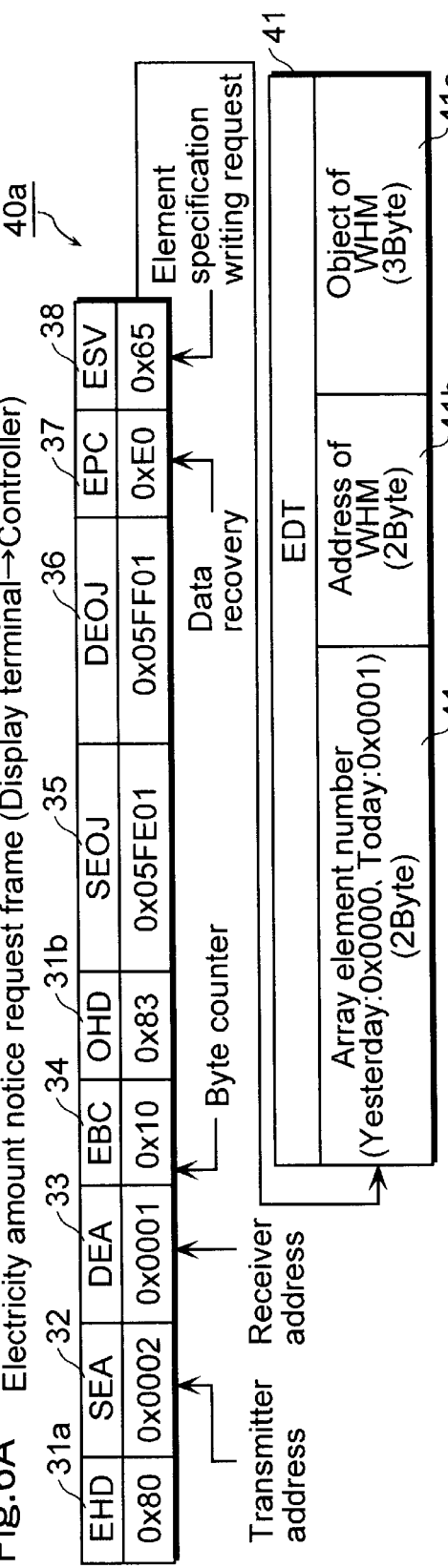
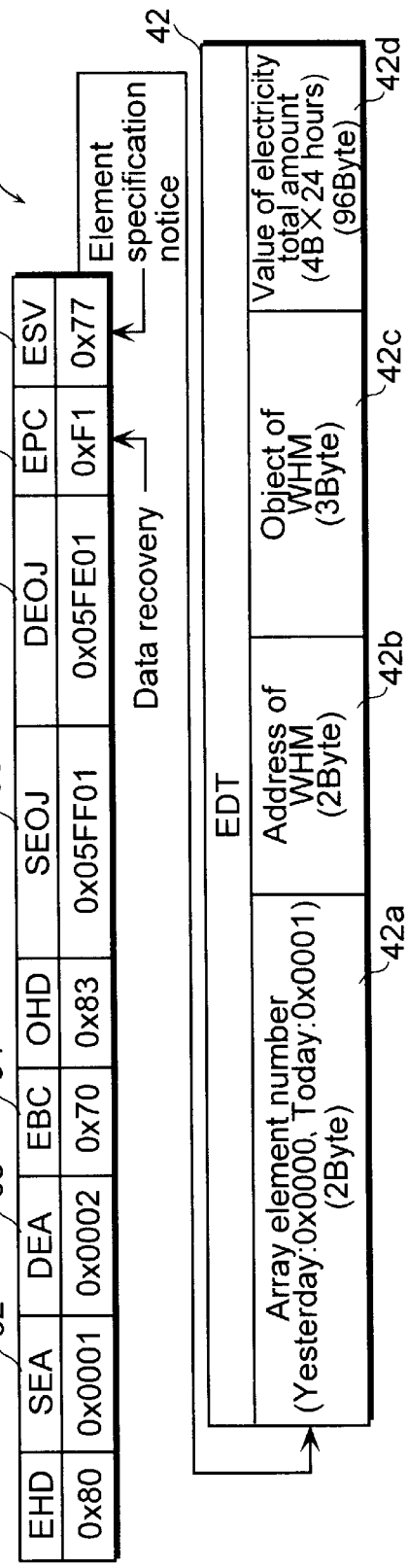

Fg.7

| | The time when the electricity amount data were acquired (1) | Electricity amount data (1) | |
|---|---|---|---|
| 1100 | | | 1200 |
| 1101 | The time when the electricity amount data were acquired (2) | Electricity amount data (2) | 1201 |
| | ... | ... | |
| 1195 | The time when the electricity amount data were acquired (96) | Electricity amount data (96) | 1295 |

96

Fg.9
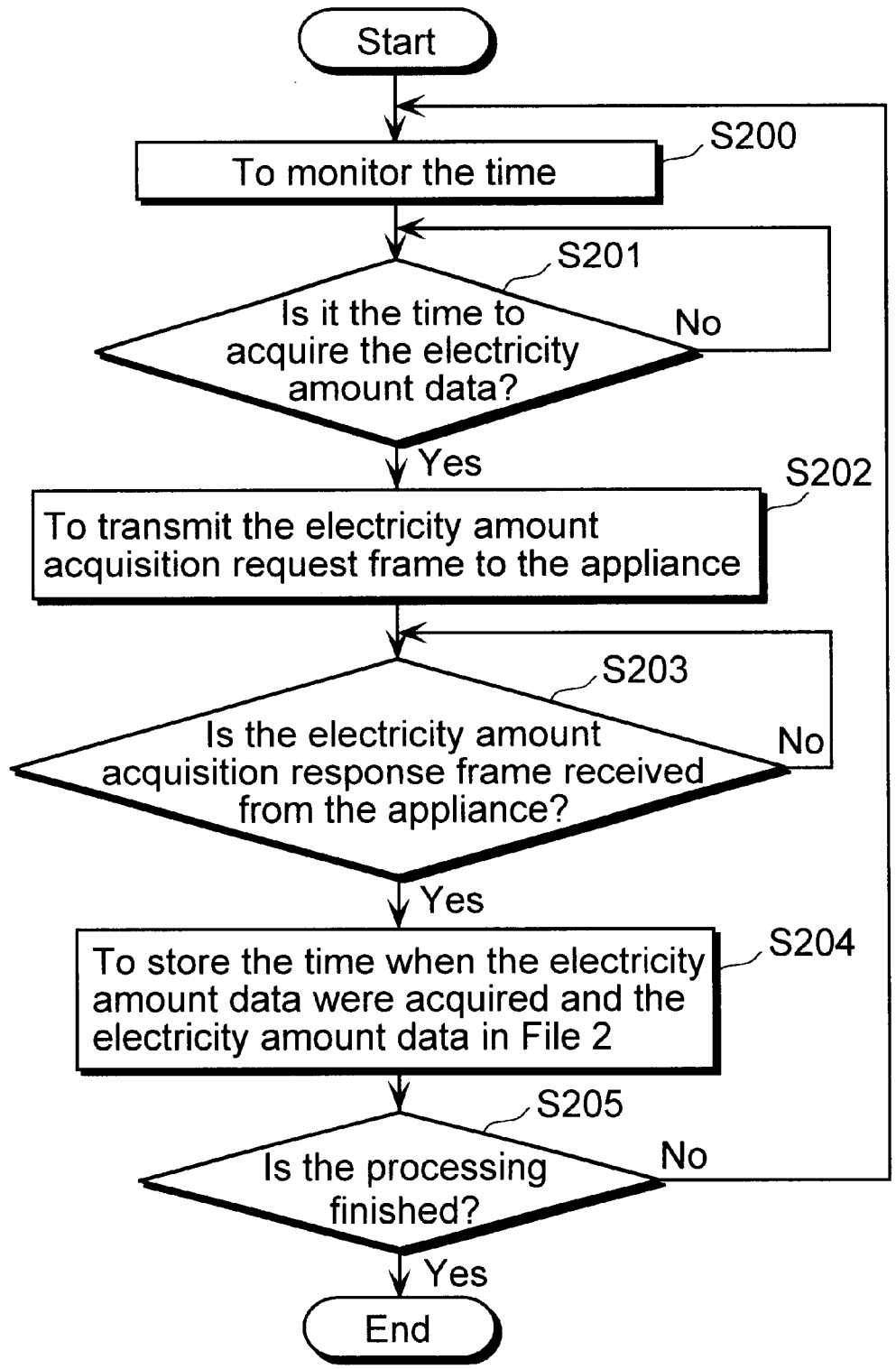

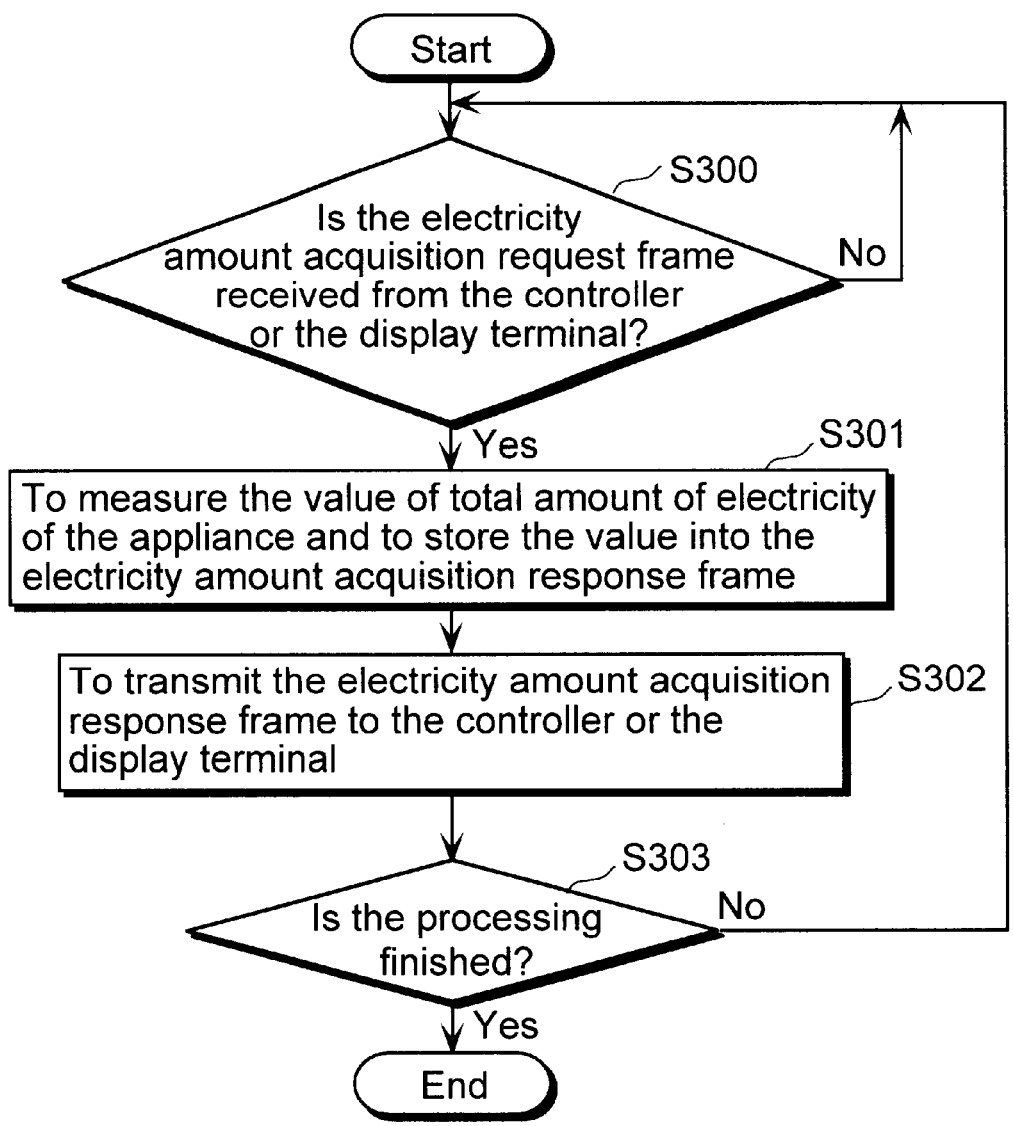
Fg.10

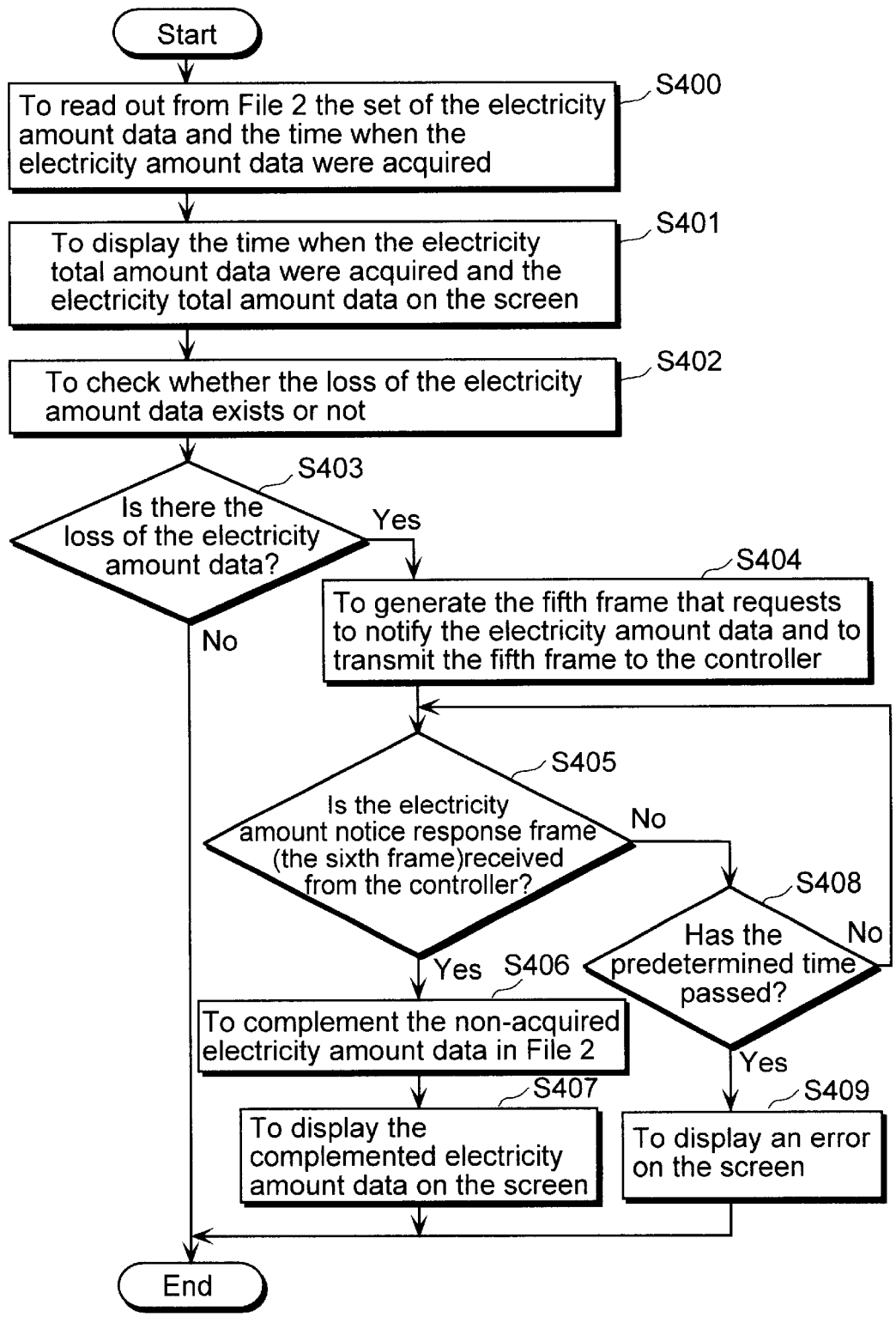

Fg.12
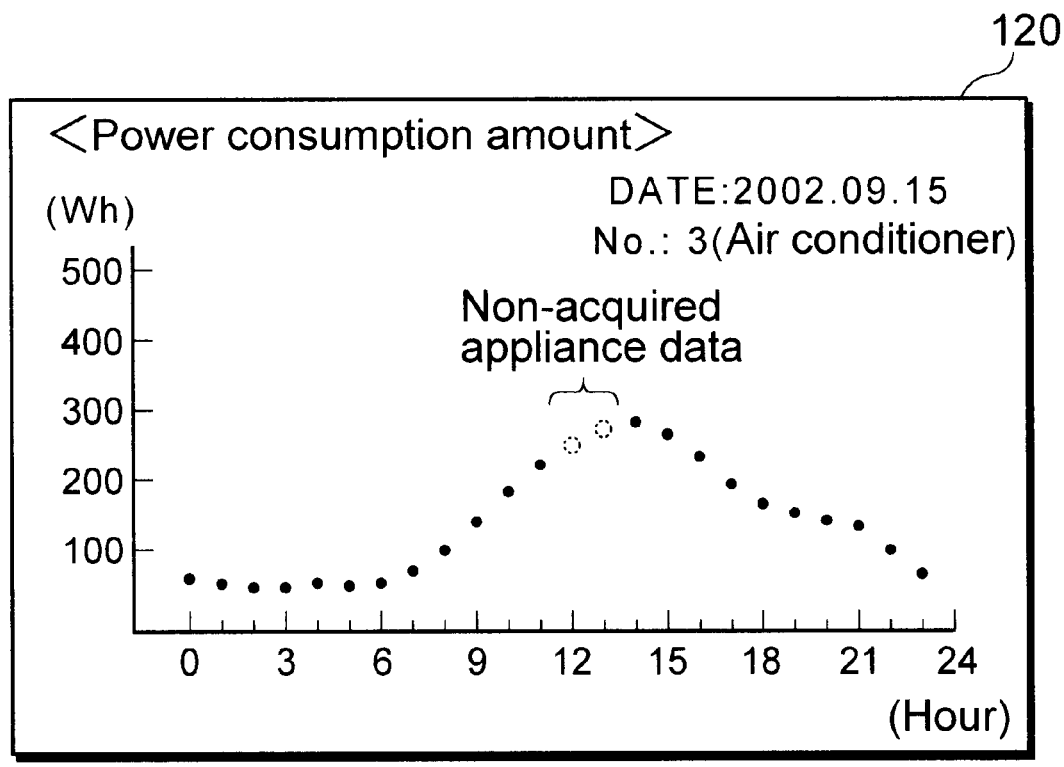

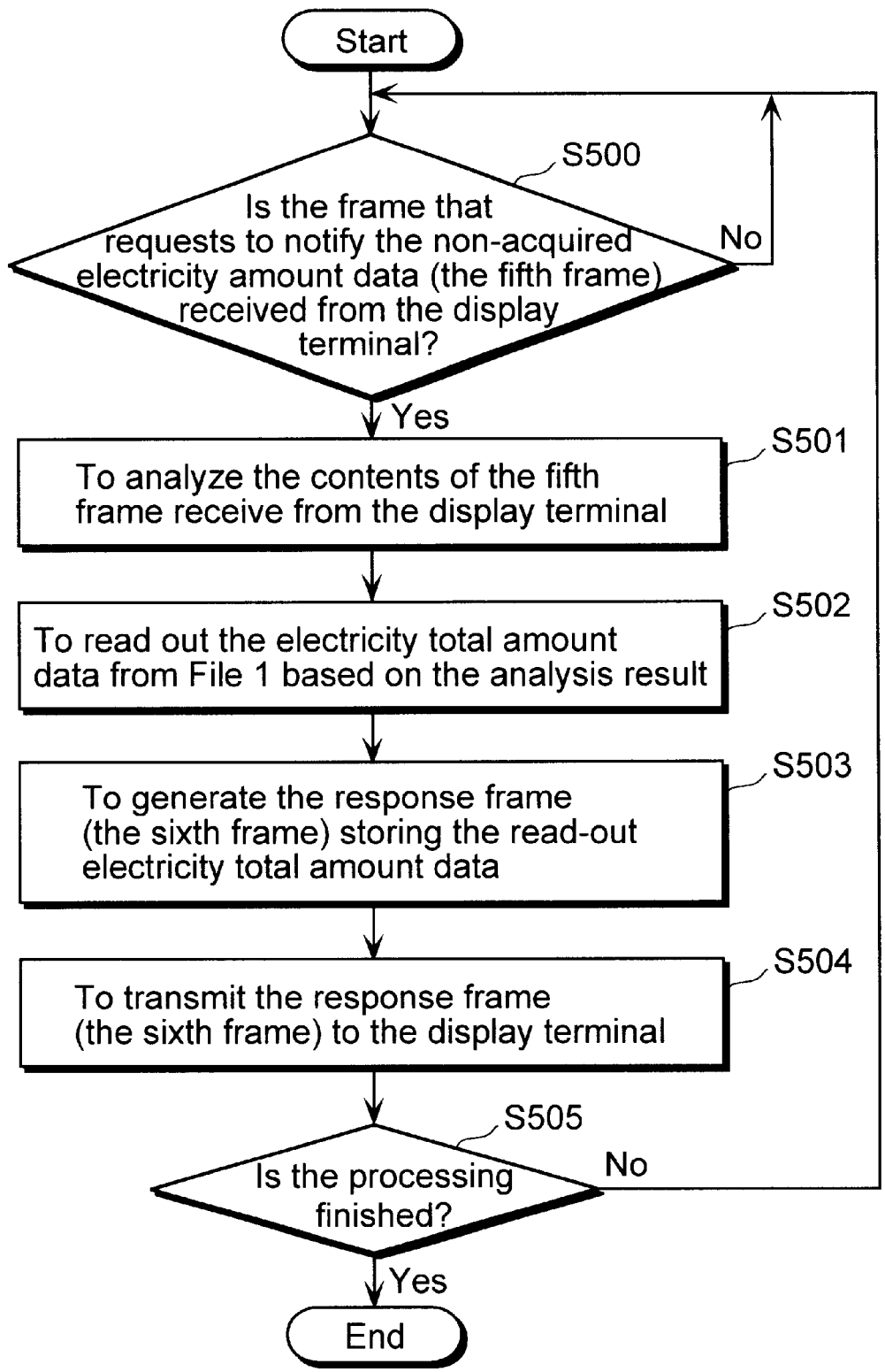
Fg.13

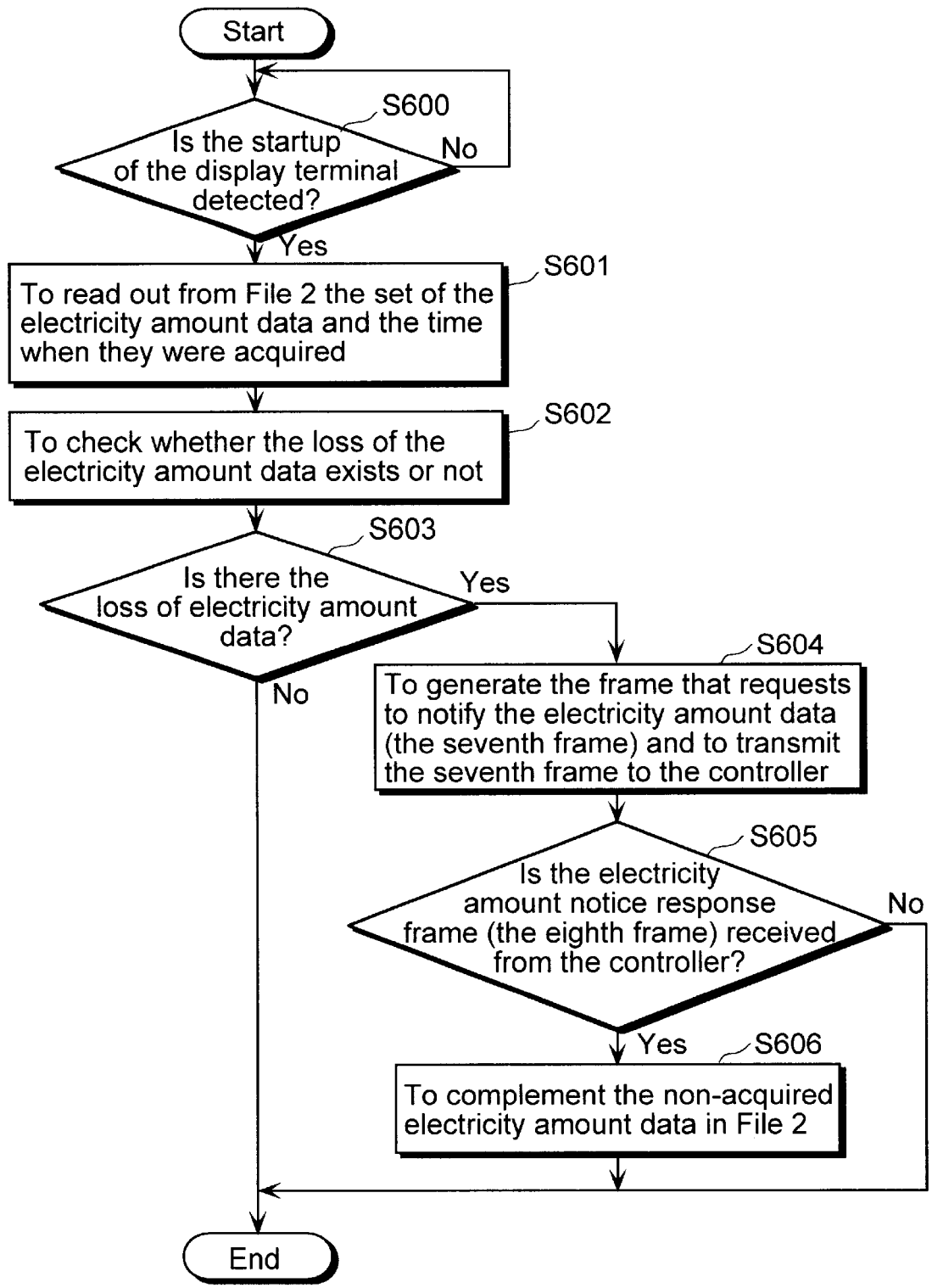

Fg.15
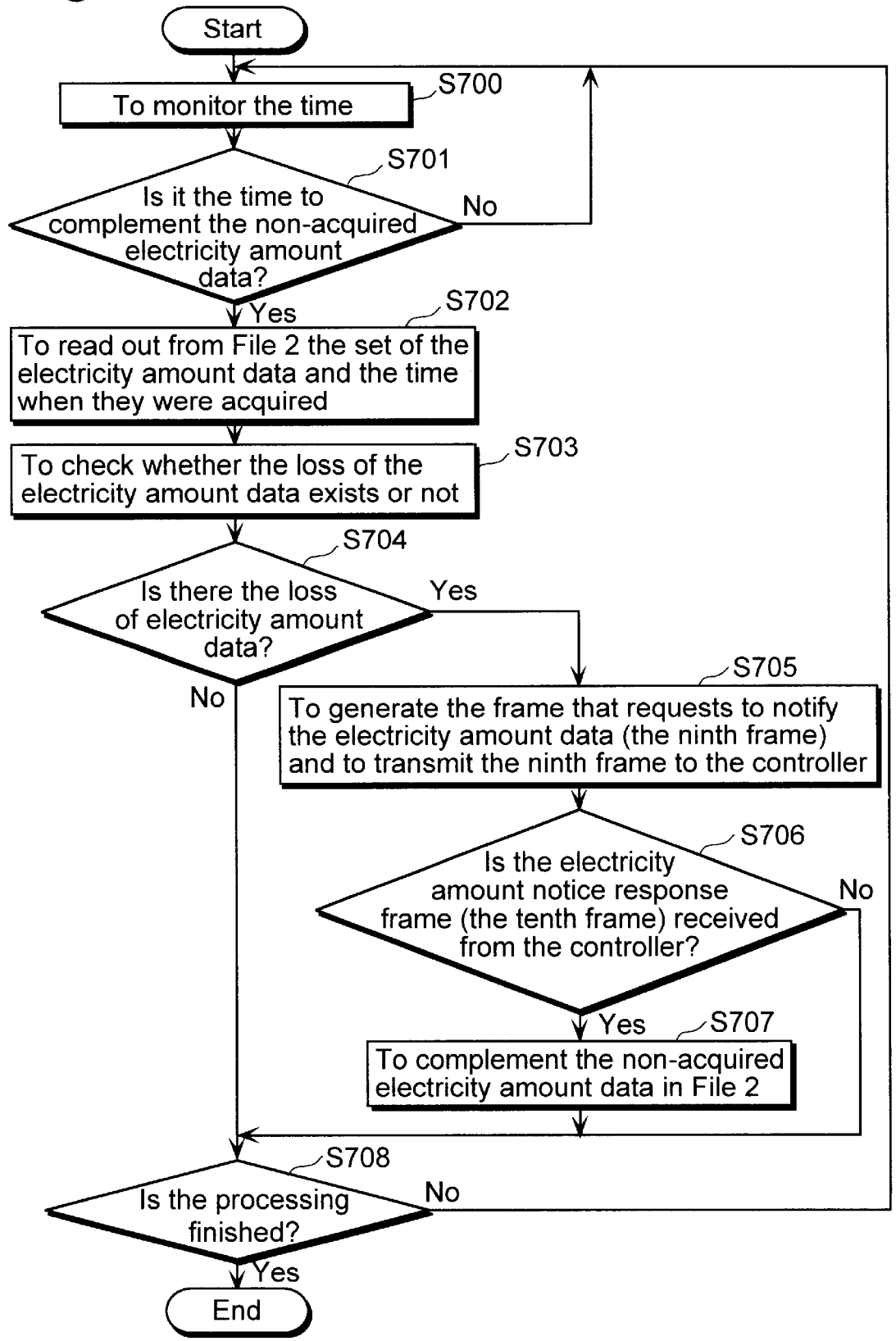

Fg.16A
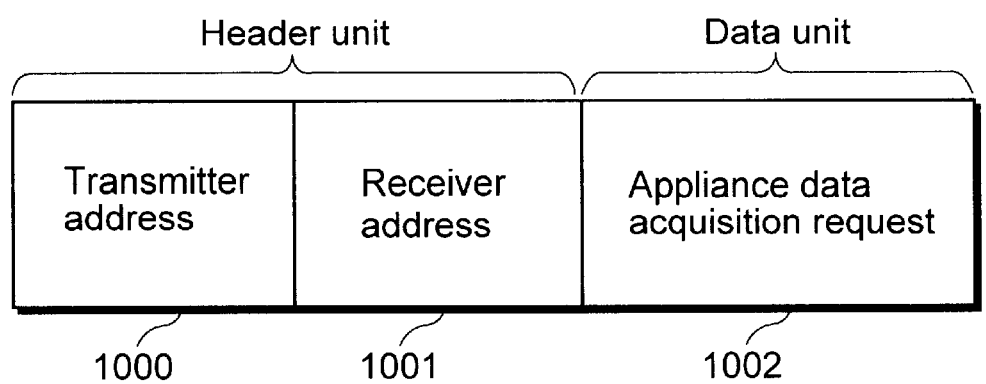
Fg.16B
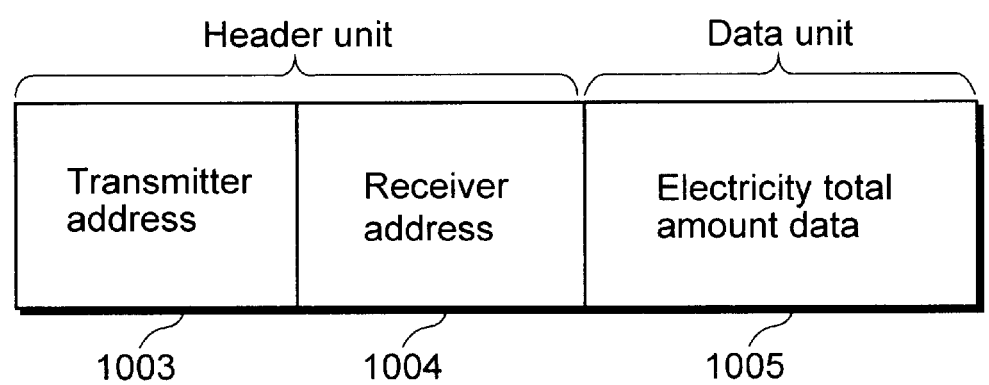

Fg.17A
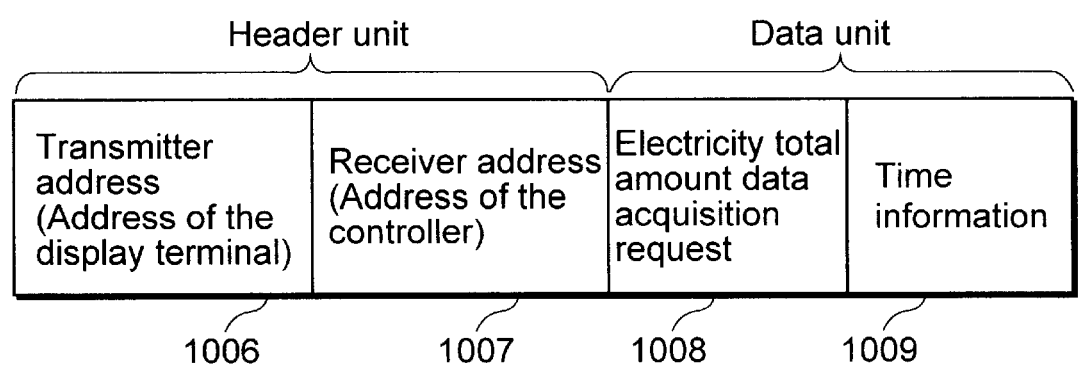
Fg.17B
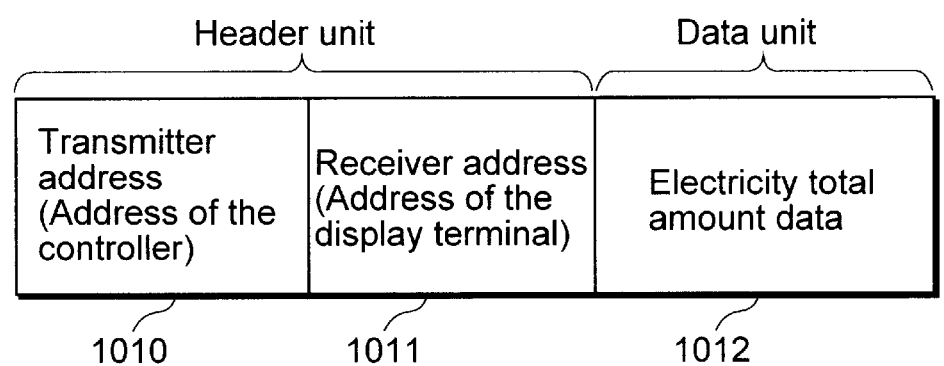

Fg.18
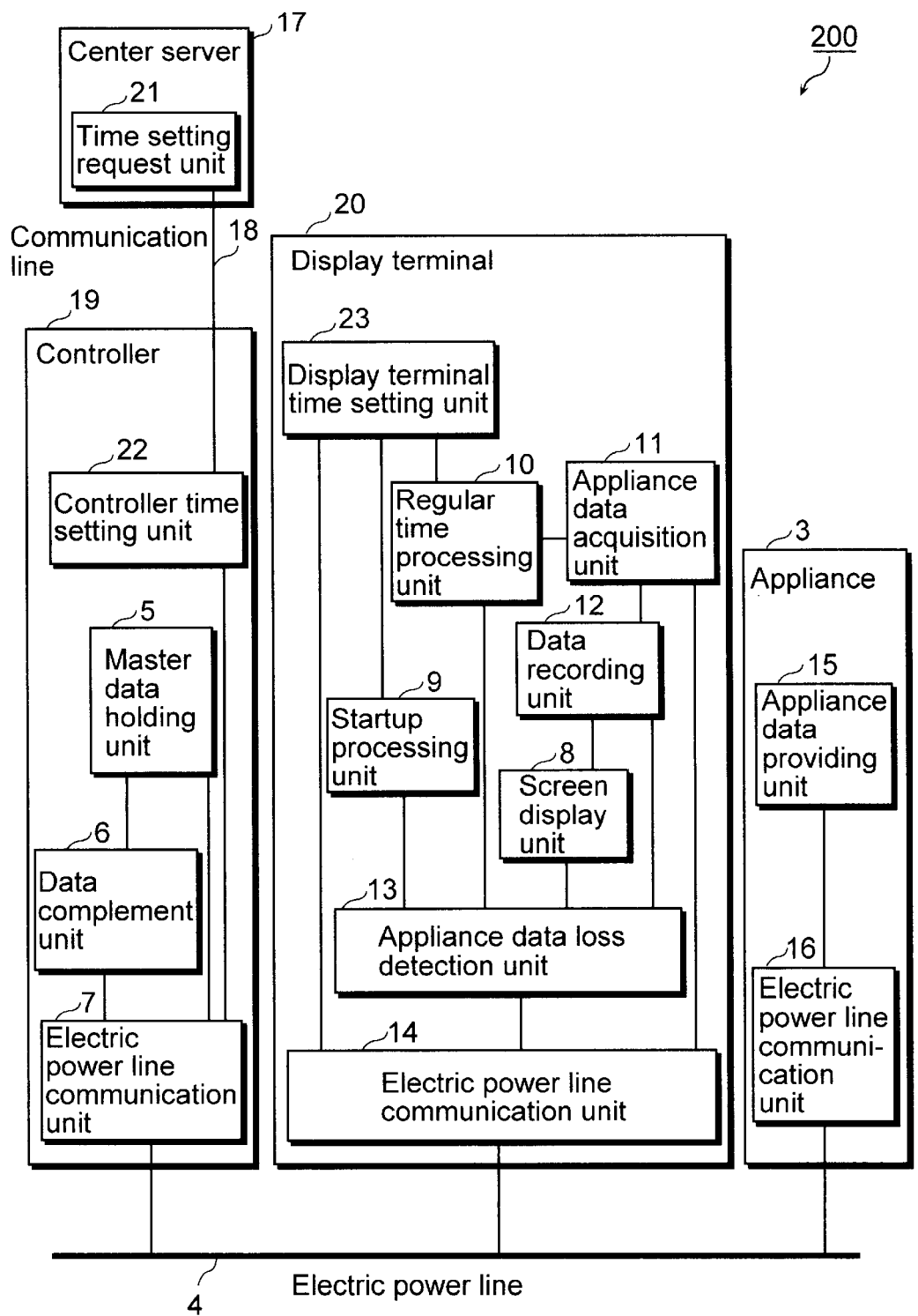

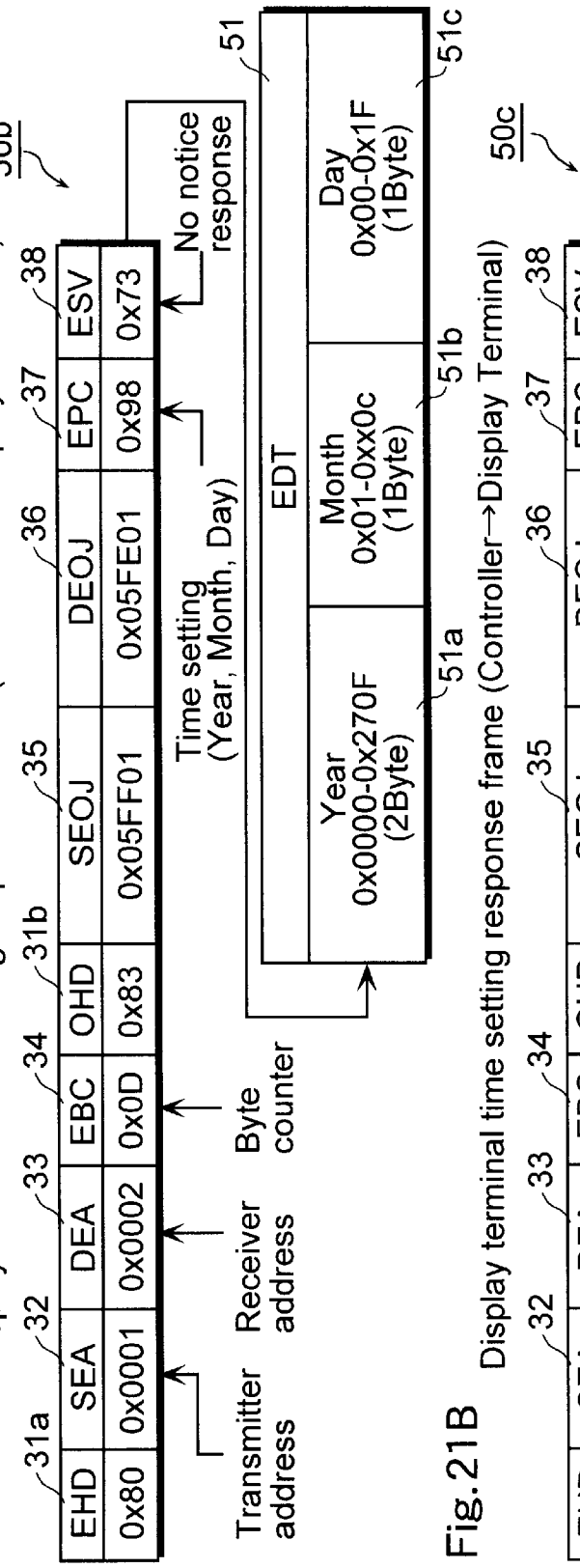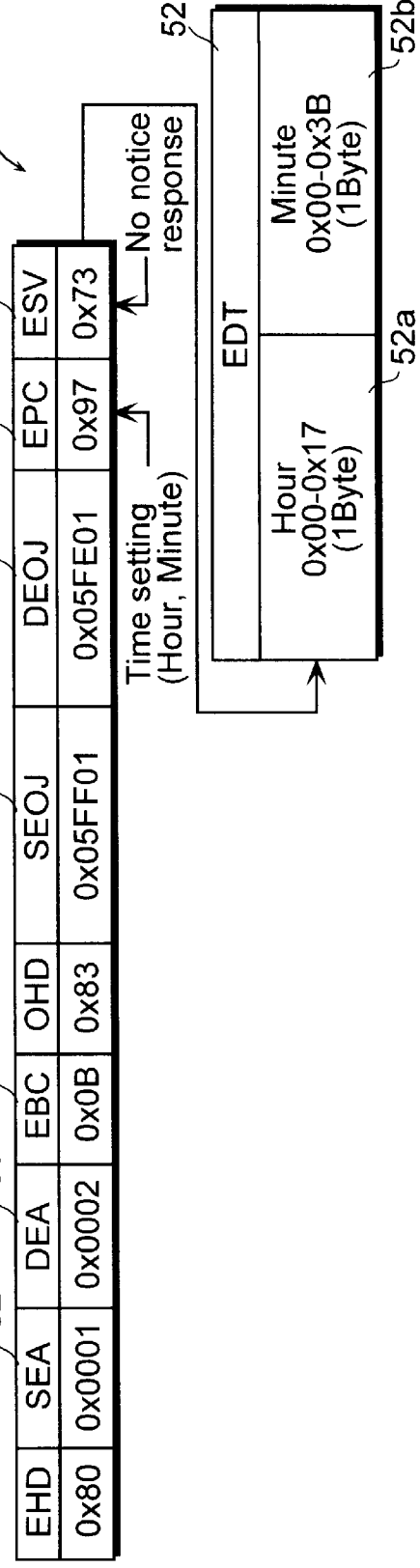
Fig.21A Display terminal time setting response frame (Controller→Display Terminal)
Fig.21B Display terminal time setting response frame (Controller→Display Terminal)

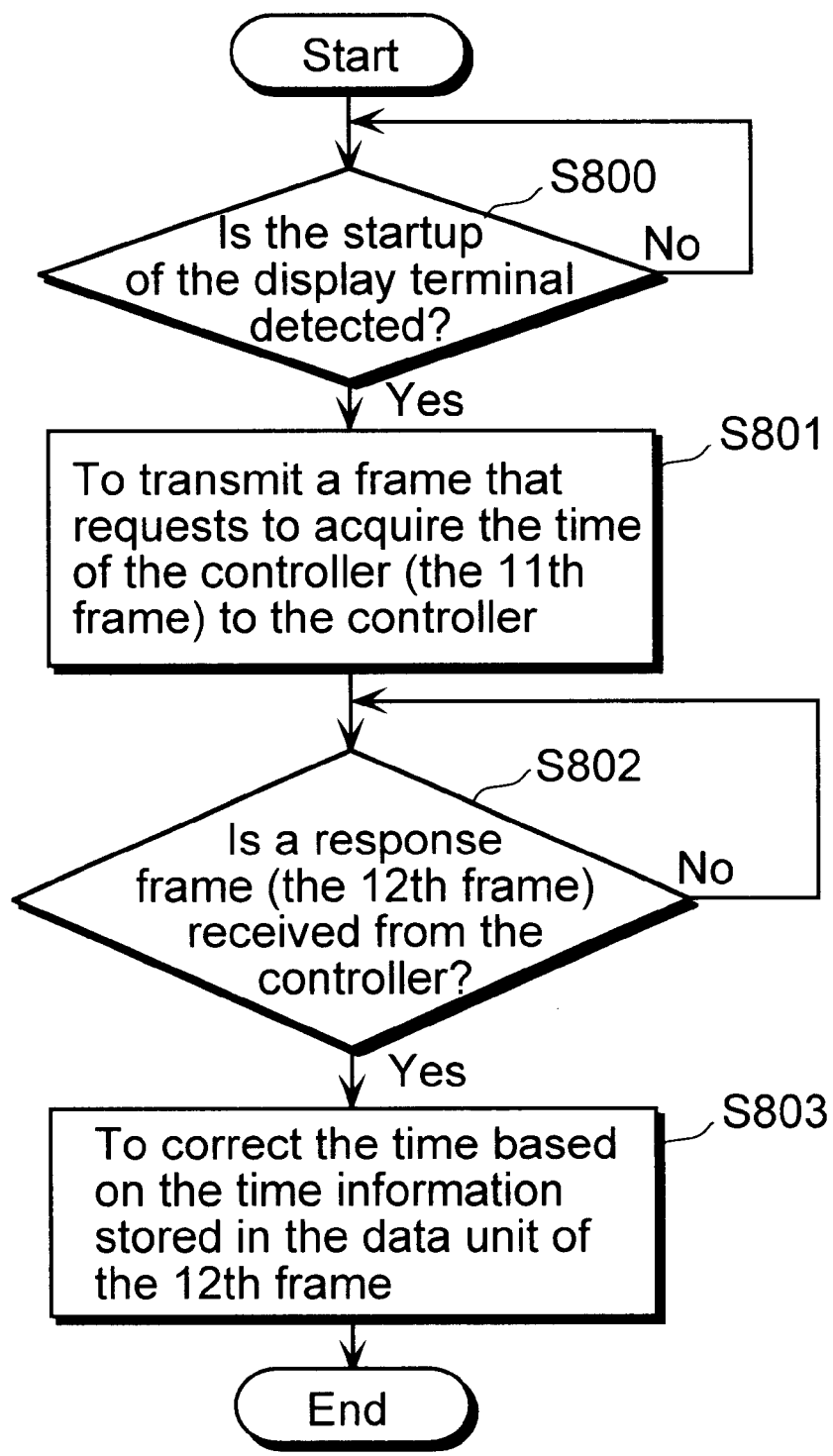

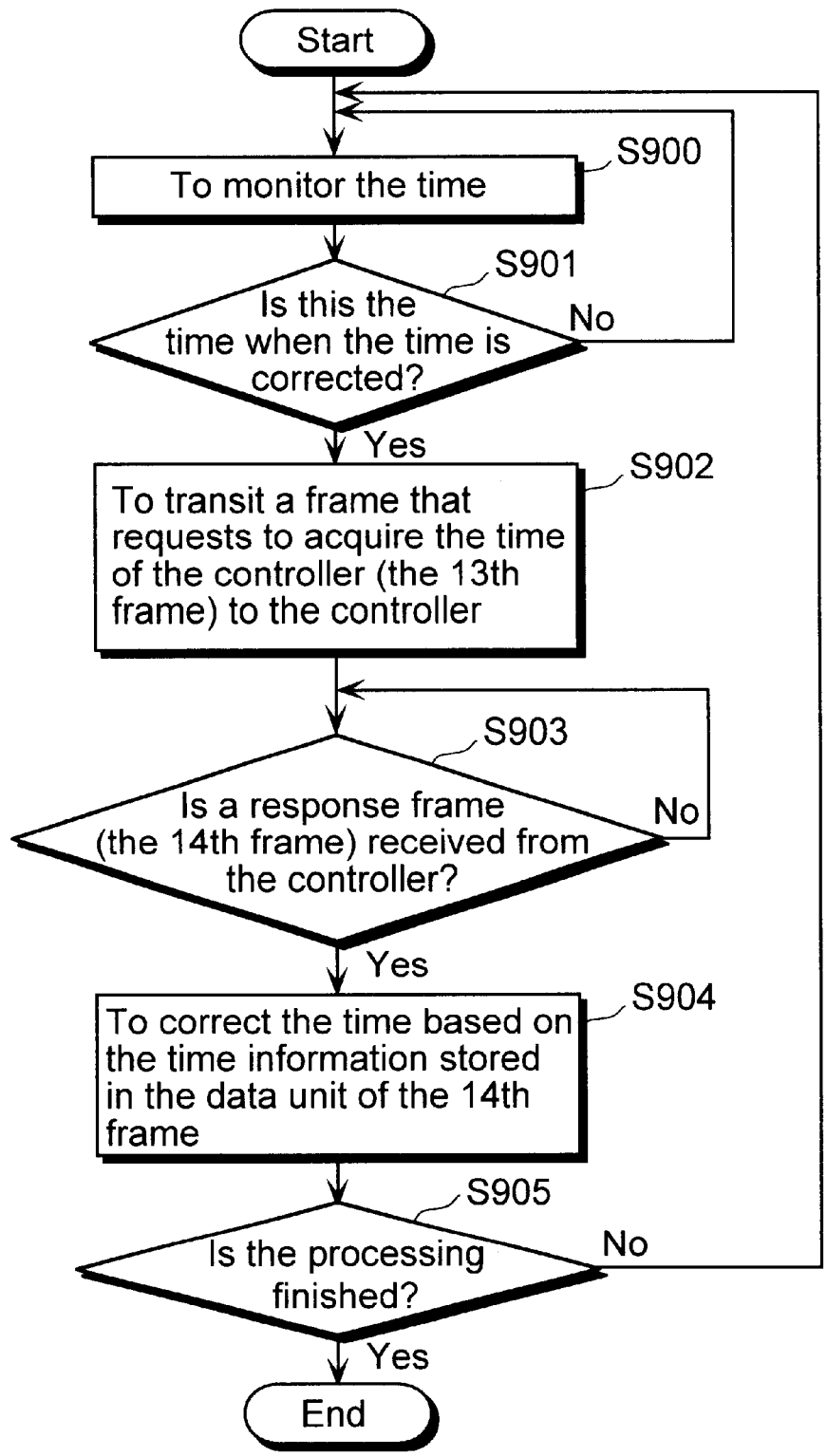
Fg. 25

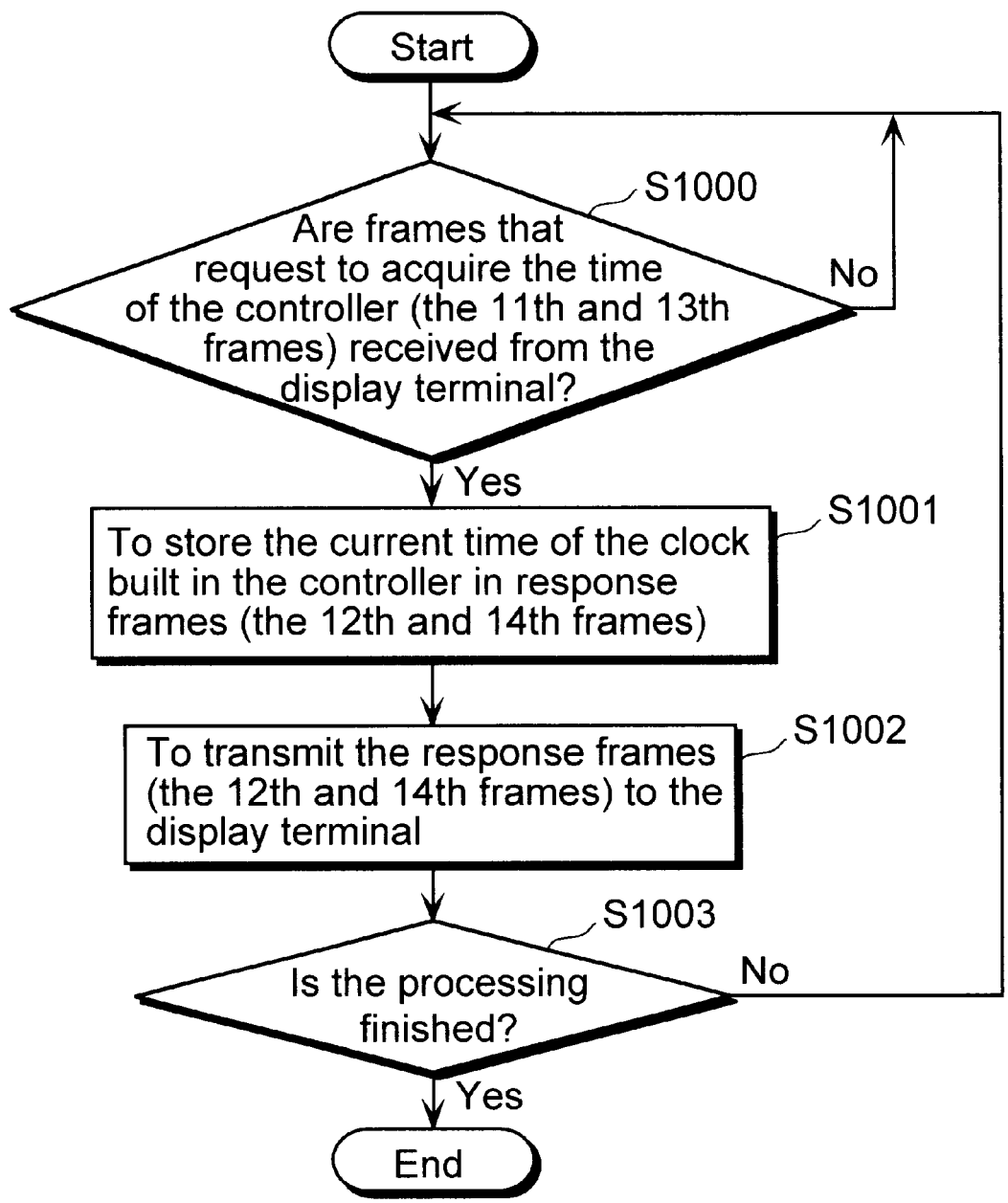
Fg. 26

Fg. 27
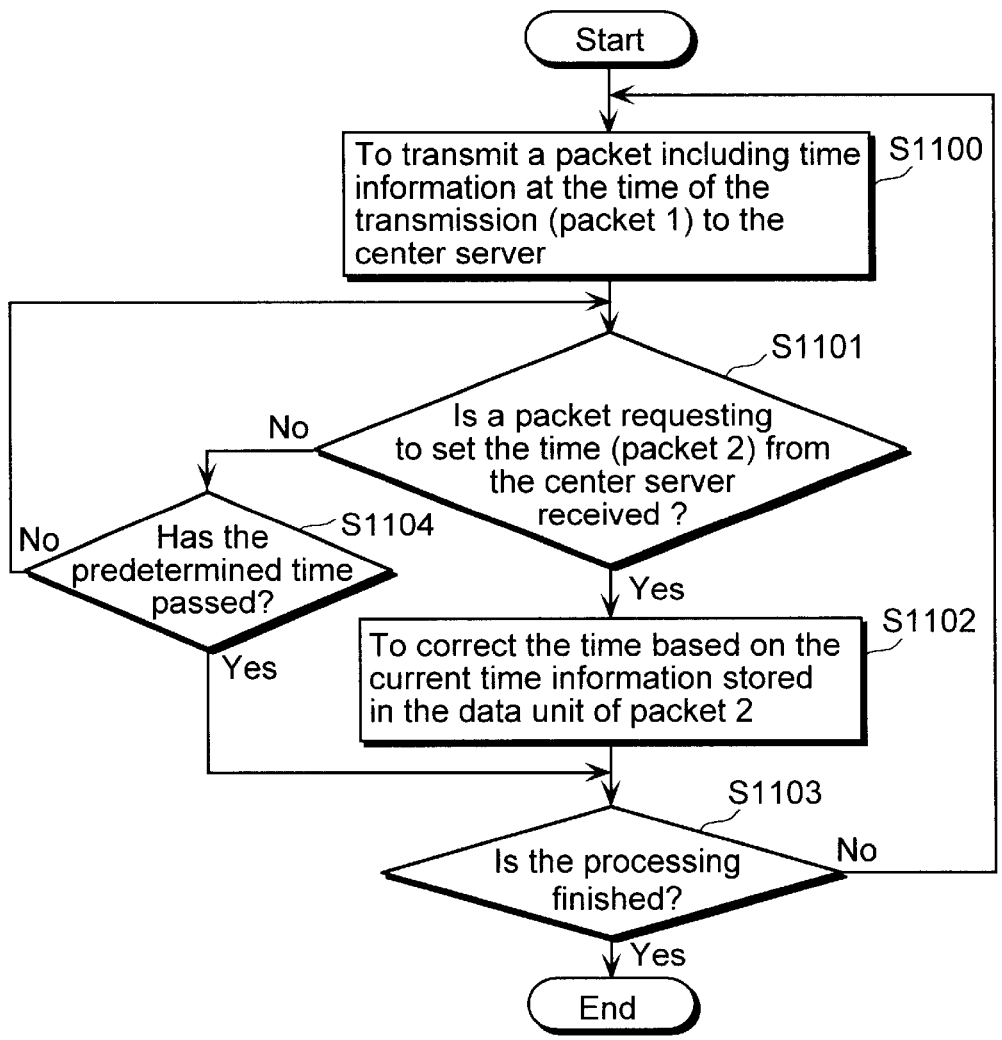

Fg. 28
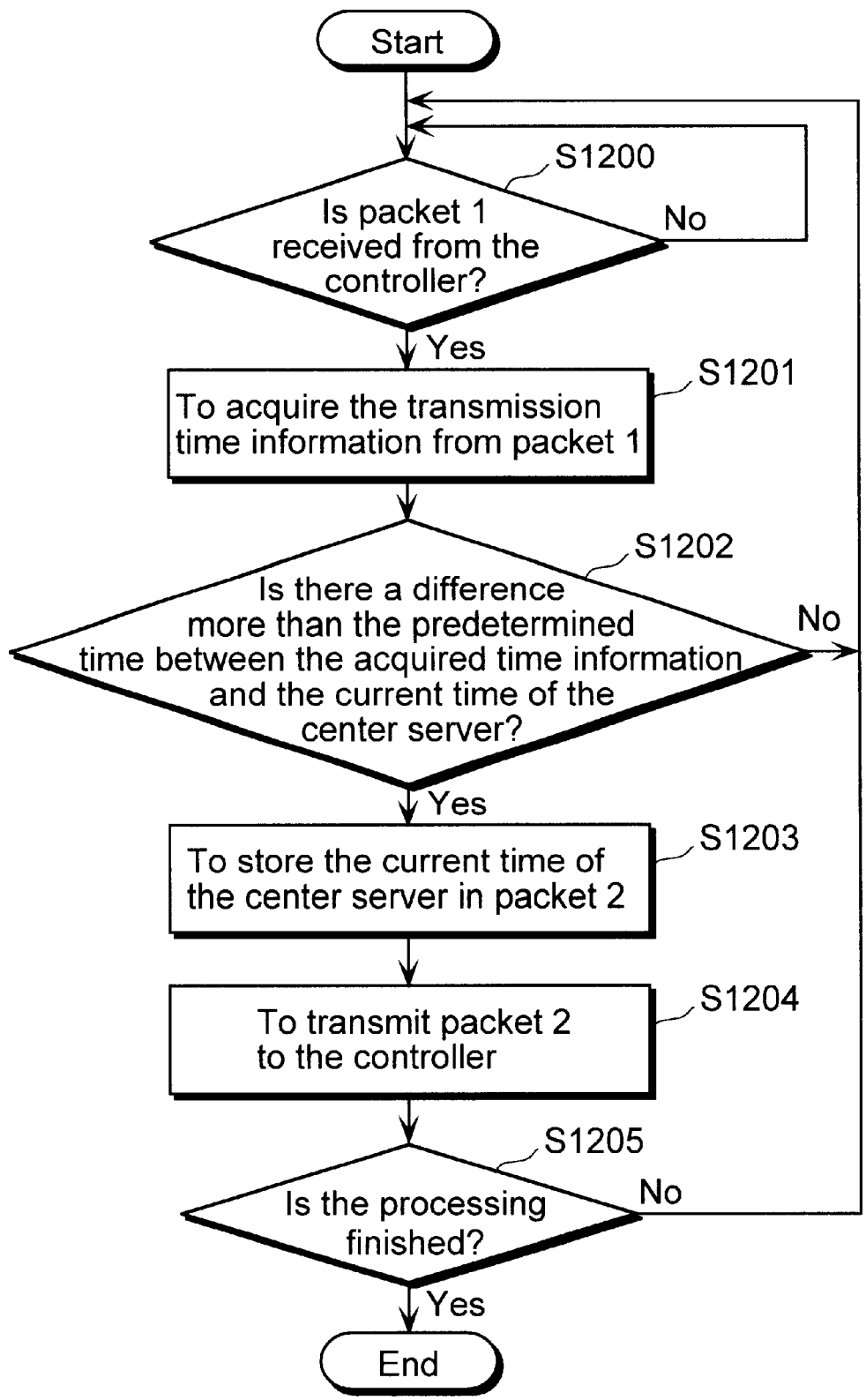

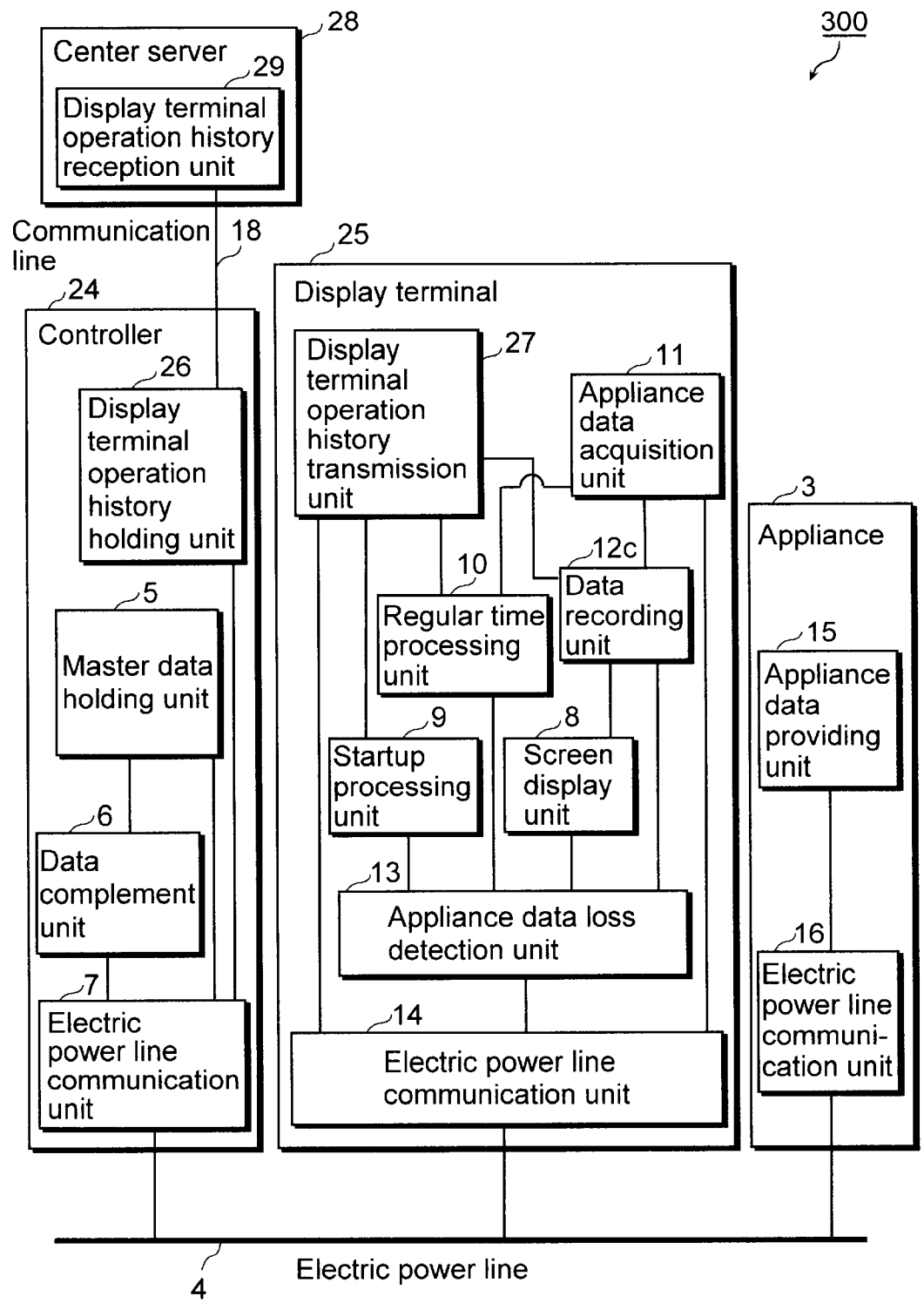
Fg. 30

Fg.31
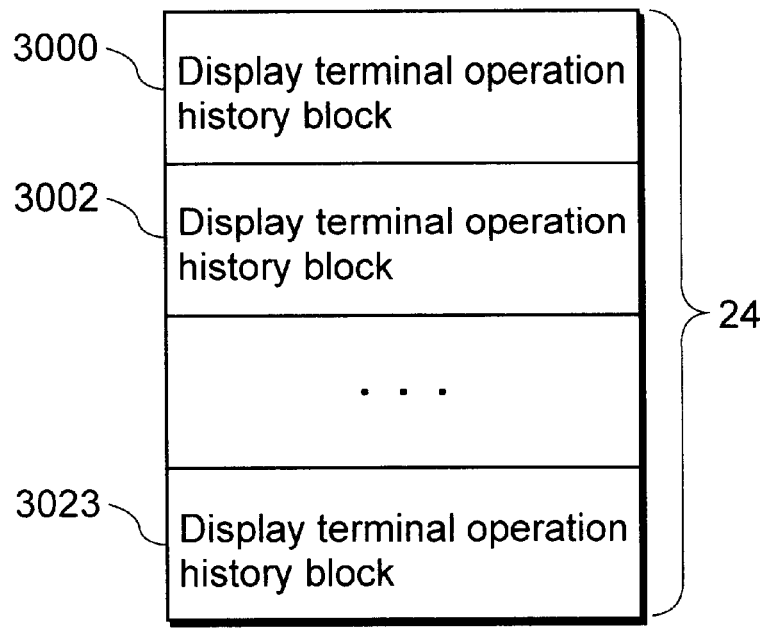
Fg.32
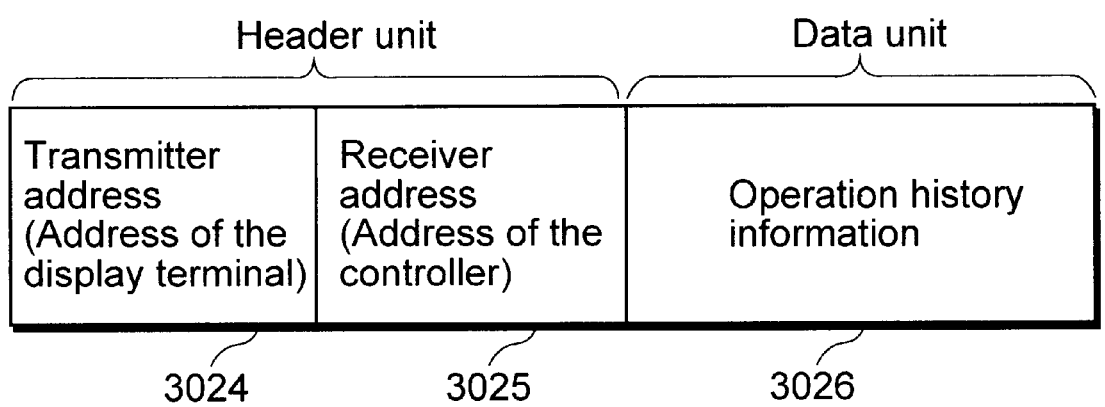

APPLIANCE DATA COLLECTING SYSTEM

BACKGROUND OF THE INVENTION (1) Field of the Invention

The present invention relates to communication system using an electric power line and particularly relates to data collecting technology on electric household appliances in electric power line communication system at home.

(2) Description of the Prior Art

Conventionally, technology of collecting data from appliances using an electric power line in home network is disclosed in the Japanese Laid-Open Patent Application Nos. H7-312649 and H10-271572. The technology of the Japanese Laid-Open Patent Application No. H7-312649 is a system in which a power transmission communication device collects sampling data held in plural terminals through an electric power line. The technology of the Japanese Laid-Open Patent No. H10-271572 is a system in which an information collecting device collects meter-reading information of a power meter placed in each household and information of a home-care support system, a household security service support system and a home automation system through an electric power line.

In the above-mentioned structures, however, it is a premise that the data collecting device is connected to the electric power line at all times but a portable display terminal that collects data on appliances may not be connected to the electric power line. In this case, the display terminal cannot collect data while it is not connected to the electric power line, and therefore there is a drawback that the display terminal cannot display the correct data on the screen even though it tries to refer to the past data because the data are not acquired. Additionally, in the system that the storage capacity of the display terminal is not enough to hold the large quantity of data on the appliances and therefore the display terminal must acquire the data from a controller every time it displays the data. Further, when the display terminal analyzes and displays the data frequently or the data quantity is large, there is also a problem that the communication quantity becomes enormous, communication efficiency deteriorates and furthermore the display response is degraded.

SUMMARY OF THE INVENTION

In view of the foregoing, it is the object of the present invention to provide a home network system that can display non-collected data even if there is a time period when the data on the appliances are not acquired in the display terminal.

To achieve the above-mentioned object, the display terminal device according to the present invention is the display terminal device in an appliance data collecting system comprising: one or more appliances, the display terminal device and a control device that receive power supply from an electric power line and can communicate each other through the electric power line, wherein the control device collects and holds predetermined data on the appliances from the appliances regularly and without omission through the electric power line, and the display terminal device includes: a data acquisition unit that collects regularly and holds the predetermined data from the appliances; a non-collected data judgment unit that judges whether the non-collected data exists or not in the stored predetermined data; a non-collected data request unit requests the control device to transmit data on the non-collection when the non-collected data are judged to exist; and a data complement unit that receives and complements the data on the non-collection from the control device.

In doing this, the display terminal device can acquire the appliance data from each appliance and complement the non-collected appliance data from the control device.

Additionally, to achieve the above-mentioned object, the display terminal device according to the present invention is the display terminal device further including a time measurement unit that measures passage of time and identifies the time, wherein the data acquisition unit further includes a collection time decision unit that decides the time to collect the predetermined data at regular intervals based on the time identified by the time measurement unit and collects the predetermined data when the decided time comes.

In doing this, the display terminal device can acquire the appliance data from each appliance regularly and complement the appliance data during the non-collected time period from the control device.

Further, to achieve the above-mentioned object, the display terminal according to the present invention is the display terminal device further including: a power supply detection unit operable to detect a start of the power supply; a first regular time detection unit operable to detect the predetermined regular time to execute the judgment on the predetermined data based on the time identified by the time measurement unit; and a startup regular time processing unit operable to instruct the non-collected data judgment unit to execute the judgment when the above-mentioned start or the predetermined regular time is detected.

In doing this, the display terminal device can acquire the appliance data from each appliance regularly and complement the non-collected appliance data at the time of startup and regularly from the control device.

Furthermore, to achieve the above-mentioned object, the display terminal according to the present invention is the display terminal device further including: a second regular time detection unit operable to detect the specified regular time to correct the time of the clock according to the time measurement unit based on the time identified by the time measurement unit; a time request unit operable to request the control device to transmit information that represents the current time when the start of the power supply or the specified regular time is detected; the time reception unit operable to receive the information that represents the time from the control device; and the time correction unit operable to correct the current time of the clock according to the time measurement unit based on the received information.

In doing this, the display terminal device can acquire the appliance data from each appliance regularly, complement the non-collected appliance data at the time of startup and regularly from the control device and correct the time of the built-in clock based on the clock of the control device.

Additionally, to achieve the above-mentioned object, the control device according to the present invention is the control device in an appliance data collecting system comprising: one or more appliances, the display terminal device and a control device that receive power supply from an electric power line and can communicate each other through the electric power line, wherein the display terminal device collects and holds predetermined data on the appliances from the appliances regularly through the electric power line, and the control device includes: a data acquisition unit that collects and holds the predetermined data from the appliances regularly and without omission; a data request reception unit that receives a specified request on the predetermined data from the display terminal device; and a data transmission unit that transmits the predetermined data that are held to the display terminal device based on the received request.

In doing this, since the control device transmits the appliance data based on a request of the display terminal device, the display terminal device can complement the non-collected appliance data.

Moreover, to achieve the above-mentioned object, the present invention can be realized as a display method or a system control method with the characteristic structure units of the above-mentioned each device as steps or can be realized as a program that includes all the steps.

Further, to achieve the above-mentioned object, the present invention can be realized as an appliance data collecting system that comprises the above-mentioned each device.

Japanese patent application Ser. No. 2002-001991 filed on Jan. 9, 2002 is incorporated herein by reference.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 4A is a diagram that shows an example of data structure of an electricity amount acquisition request frame transmitted by the controller to the appliance.

FIG. 4B is a diagram that shows an example of data structure of an electricity amount acquisition response frame transmitted by the appliance to the controller.

FIG. 6A is a diagram that shows an example of data structure of an electricity amount notice request frame transmitted by the display terminal to the controller.

FIG. 6B is a diagram that shows an example of data structure of an electricity amount notice response frame transmitted by the controller to the display terminal.

FIG. 7 is a diagram that shows an example of data structure of a master data file (File 1) of the controller and an appliance data file (File 2) of the display terminal.

FIG. 9 is a flowchart that shows processing when the display terminal acquires the electricity amount data from the appliance regularly.

FIG. 10 is a flowchart that shows processing when the appliance transmits the electricity amount data to the controller or the display terminal.

FIG. 11 is a flowchart when processing to complement non-acquired electricity amount data starts while the display terminal displays the electricity amount data on the appliance.

FIG. 12 is a diagram that shows an example in the case of displaying the non-acquired electricity amount data for a day on a screen.

FIG. 13 is a flowchart that shows processing when the controller receives the fifth frame from the display terminal.

FIG. 14 is a flowchart that shows processing when the display terminal acquires the non-acquired electricity amount data from the controller on startup of the display terminal.

FIG. 15 is a flowchart that shows processing when the display terminal acquires the non-acquired electricity amount data from the controller regularly.

FIG. 16A is a diagram that shows an example of data structure of data frame that simplifies the first frame.

FIG. 16B is a diagram that shows an example of data structure of data frame that simplifies the second frame.

FIG. 17A is a diagram that shows an example of data structure of data frame that simplifies the fifth frame.

FIG. 17B is a diagram that shows an example of data structure of data frame that simplifies the sixth frame.

FIG. 18 is a block diagram that shows a structure of the data collecting system according to the second embodiment and the functional structures of each device.

FIG. 21A is a diagram that shows an example of data structure of a display terminal time setting response frame transmitted by the controller to the display terminal.

FIG. 21B is a diagram that shows another example of data structure of a display terminal time setting response frame transmitted by the controller to the display terminal.

FIG. 24 is a flowchart that shows processing when the display terminal synchronizes the time with the controller on startup of the display terminal.

FIG. 25 is a flowchart that shows processing when the display terminal synchronizes the time with the controller regularly.

FIG. 26 is a flowchart that shows processing when the controller synchronizes the time with the display terminal.

FIG. 27 is a flowchart that shows processing when the controller acquires current time information from the center server and sets the correct time.

FIG. 28 is a flowchart that shows processing when the center server requests the controller to set the time.

FIG. 30 is a block diagram that shows a structure of the data collecting system according to the third embodiment and the functional structures of each device.

FIG. 31 is a diagram that shows an example of data structure of File 3.

FIG. 32 is a diagram that shows an example of a format of the 15th frame.

DESCRIPTION OF THE PREFERRED EMBODIMENT(S)

The appliance data collecting system will be explained below with reference to the figures.

(The First Embodiment)

Figure 1:
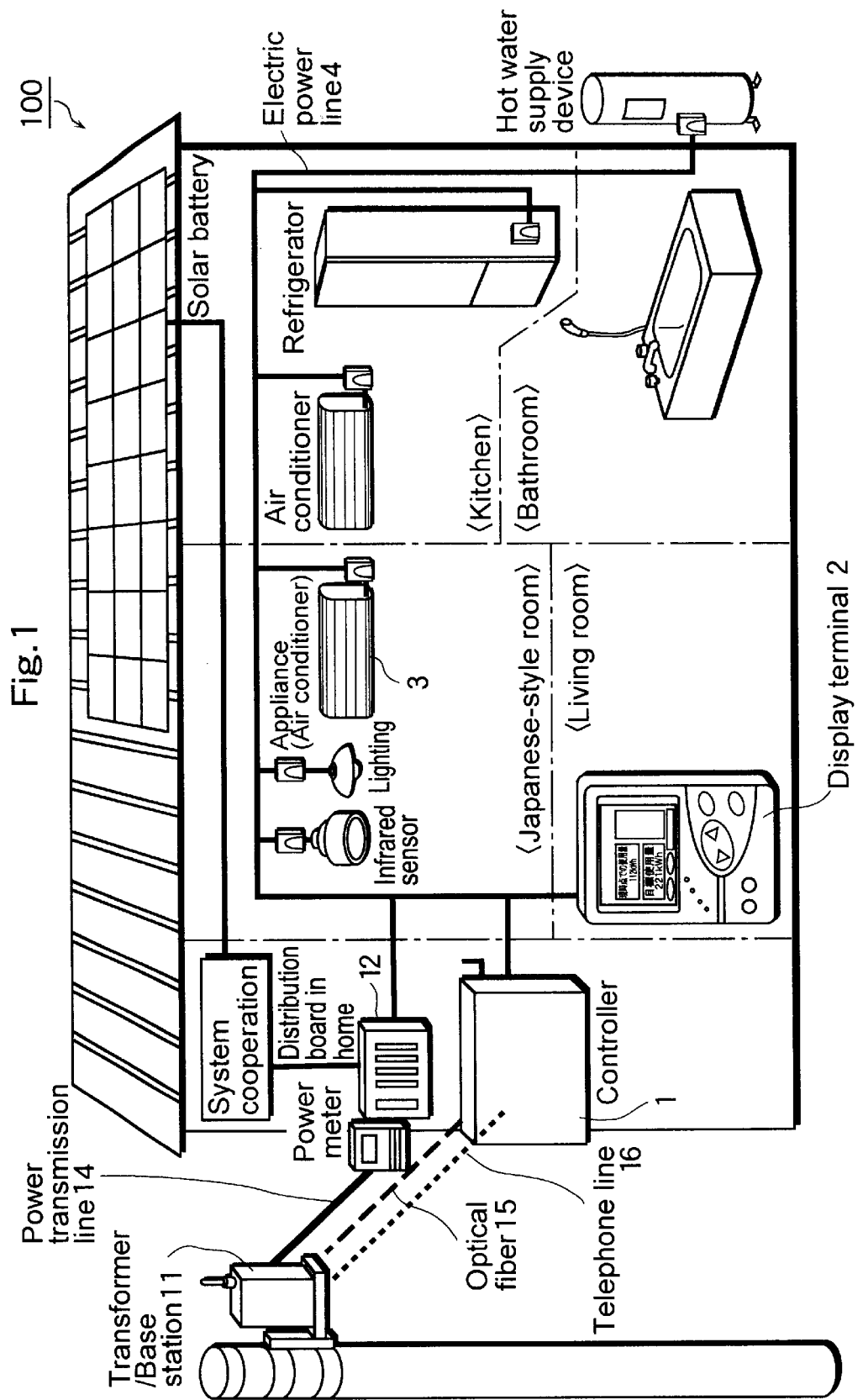
FIG. 1 is a diagrammatic sketch of an appliance data collecting system according to the first embodiment.

FIG. 1 is a diagrammatic sketch of an appliance data collecting system 100 according to the first embodiment. This appliance data collecting system 100 has a form of LAN (Local Area Network) using an electric power line receives power supply through an outside transformer 11 and an outside power transmission line 14 and is connected with an outside network (such as Internet) through an optical fiber 15, a telephone line 16 and the like. To be more specific, the appliance data collecting system 100 is connected with a controller 1, a display terminal 2, an appliance 3 and the like through an indoor electric power line 4 and exchange data on appliances (hereafter, referred to as "appliance data") each other. Here, concrete examples of the appliance data are data on the use situation and the like of the appliance 3 such as the total amount of electricity and the used hours, data that represent an operation from a user to the display terminal 2, various control data and the like.

The controller 1 is, for example, a PLC (Power Line Communication) gateway and a device that does protocol conversion to relay between different network architectures (for example, Internet and an indoor LAN) and acquires various kinds of the appliance data regularly from the appliance 3 on the network.

The display terminal 2 is a device that has a display function (such as a liquid crystal panel) by which the user confirms the contents of the appliance data (the total amount of electricity, for example) on the appliance 3 connected to the electric power line 4 and abnormality of the network and the like. Further, the display terminal 2 is equipped with a touch panel, buttons and the like and has an operation input function that receives an operation from the user.

The appliance 3 is, for example, an electrical household appliance such as an air conditioner and a refrigerator and has a function to exchange the predetermined appliance data with the controller 1 and the display terminal 2.

Figure 2:
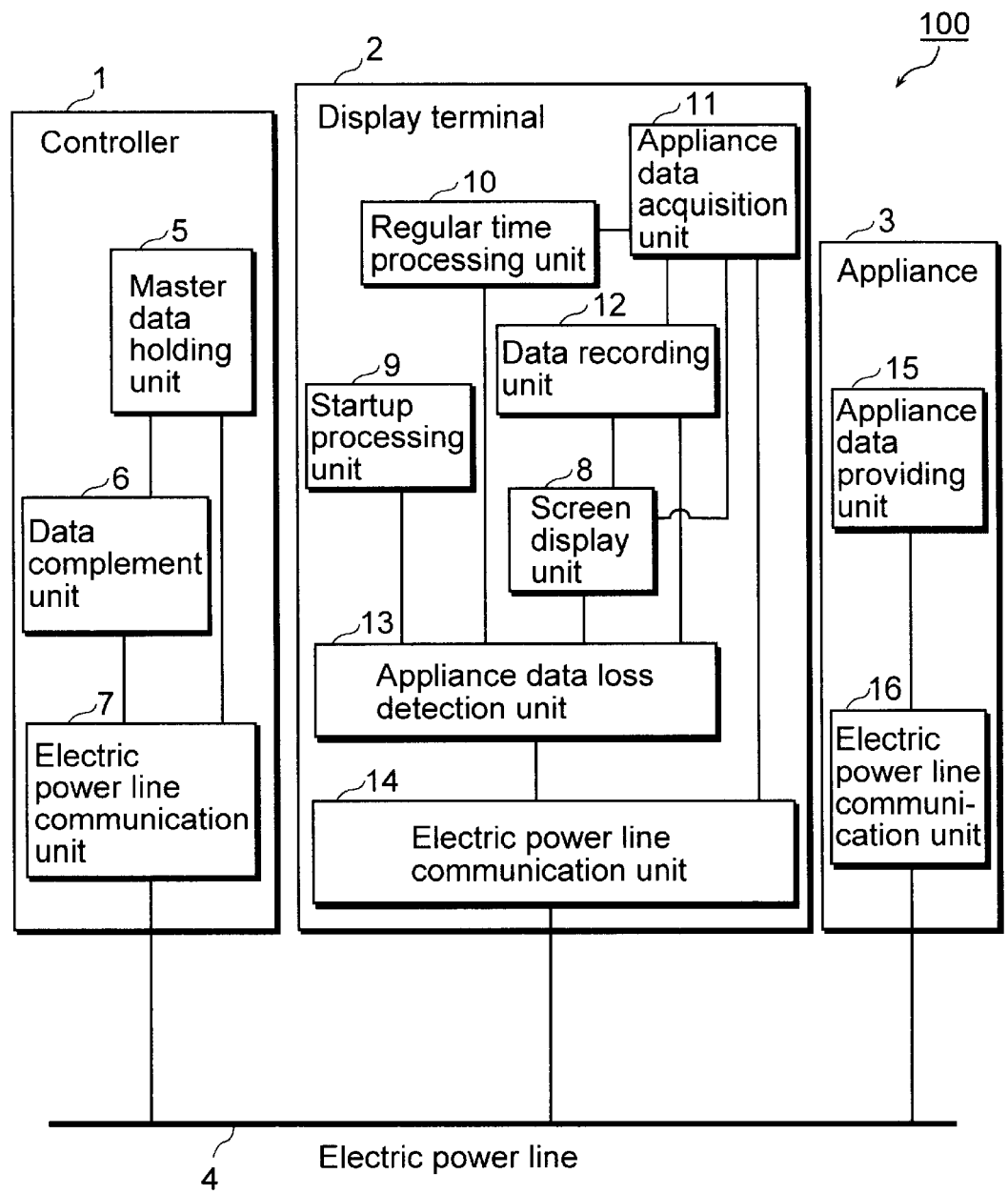
FIG. 2 is a block diagram that shows a structure of the data collecting system according to the first embodiment and the functional structures of each device.

FIG. 2 is a block diagram that shows the structure of the appliance data collecting system 100 according to the first embodiment and the functional structures of each device. FIG. 2 is a detailed diagram that is excerpted in part from the appliance data collecting system 100 in FIG. 1. As is shown in FIG. 2, the present system 100 is equipped with the controller 1, the display terminal 2 and the appliance 3 and each device is connected through the electric power line 4.

The controller 1 is, as is described above, a PLC gateway and the like, and is equipped with a master data holding unit 5, a data complement unit 6 and an electric power line communication unit 7.

The master data holding unit 5 has a built-in clock and acquires the appliance data from the appliance 3 through the electric power line communication unit 7 at the predetermined time. Further, the master data holding unit 5 stores the acquired appliance data in a master data file (hereafter, referred to as "File 1"). When the data complement unit 6 receives a frame (this "frame" will be explained later in FIG. 4) that requests to acquire the appliance data from the display terminal 2, the data complement unit 6 reads out the necessary appliance data from File 1, generates a response frame and transmits this response frame to the display terminal 2. The electric power line communication unit 7 is equipped with CPU, ROM, RAM and the like, controls the entire controller 1 and controls transmission and reception of the appliance data made through the electric power line 4.

The display terminal 2, as is described above, is a terminal device that has a display function and an operation input function, and is equipped with a screen display unit 8, a startup processing unit 9, a regular time processing unit 10, an appliance data acquisition unit 11, a data recording unit 12, an appliance data loss detection unit 13 and an electric power line communication unit 14. Moreover, this display terminal 2 is connected with a receptacle installed on the electric power line 4 through a plug and is detachable.

The screen display unit 8 reads out the appliance data on the appliance 3 from the data recording unit 12 and displays the data. Further, the screen display unit 8 has a touch panel and the like and receives operations from the user. For example, when the screen display unit 8 receives the selection of "display of the electricity amount of the previous day" from the user through the touch panel, the screen panel 8 reads out the electricity amount data for the previous day of the appliance 3 from the data recording unit 12 and displays the data.

When the startup processing unit 9 detects the startup of the display terminal 2, it calls the appliance data loss detection unit 13. To be more specific, the startup processing unit 9 is equipped with CPU, ROM, batteries and the like and detects "Power On" of the display terminal 2 (namely, the start of the power supply through the receptacle installed on the electric power line 4).

The regular time processing unit 10 has a built-in clock and monitors this clock for passage of time, calls the appliance data loss detection unit 13 at every predetermined time (23:55 every day, for example) and controls the appliance data loss detection unit 13. The appliance data acquisition unit 11, following the time of the clock built in the regular time processing unit 10, acquires appliance data on the appliance 3 through the electric power line communication unit 14 at the predetermined interval (every 15 minutes, for example). The data recording unit 12 stores the appliance data on the appliance 3 acquired by the appliance data acquisition unit 11 in an appliance data file (hereafter, referred to as "File 2"). Consequently, even if the predetermined time comes, when the appliance data are non-acquired (or "non-collected") through the electric power line communication unit 14, the appliance data at that moment are not acquired. Further, the data recording unit 12 holds the non-acquired appliance data on the appliance 3 acquired by the appliance data loss detection unit 13 in File 2.

The appliance data loss detection unit 13 detects whether the appliance data loss exists or not referring to the data recording unit 12 by an instruction from the startup processing unit 9 or the regular time processing unit 10. If there is a loss, the appliance data loss detection unit 13 generates a frame to acquire the non-acquired appliance data and transmits the frame to the controller 1 through the electric power line communication unit 14. Further, the appliance data loss detection unit 13 receives the appliance data transmitted by the controller 1 through the electric power line 14 and stores the appliance data (in other words, complements the non-acquired appliance data) in the data recording unit. The electric power line communication unit 14 has the similar communication function to the electric power line communication unit 7 in the controller 1.

The appliance 3, as is described above, is an electric household appliance such as an air conditioner and is equipped with an appliance data providing unit 15 and an electric power line communication unit 16.

The appliance data providing unit 15 measures or acquires the appliance data on the appliance 3 regularly and holds them, generates a response frame and transmits the response frame to the controller 1 or the display terminal 2 through electric power line communication unit 16 when the appliance data providing unit 15 receives a request to acquire the appliance data from the controller 1 or the display terminal 2. The electric power line communication unit 16 has a communication function similarly to the electric power line communication unit 7 in the controller 1.

Moreover, to exchange the appliance data as is described above, a "frame" indicated below is used. Additionally, hereafter, data that represents the electricity total amount (or power consumption amount) of the appliance 3 at a certain time is referred to as "the electricity amount data".

Figure 3:
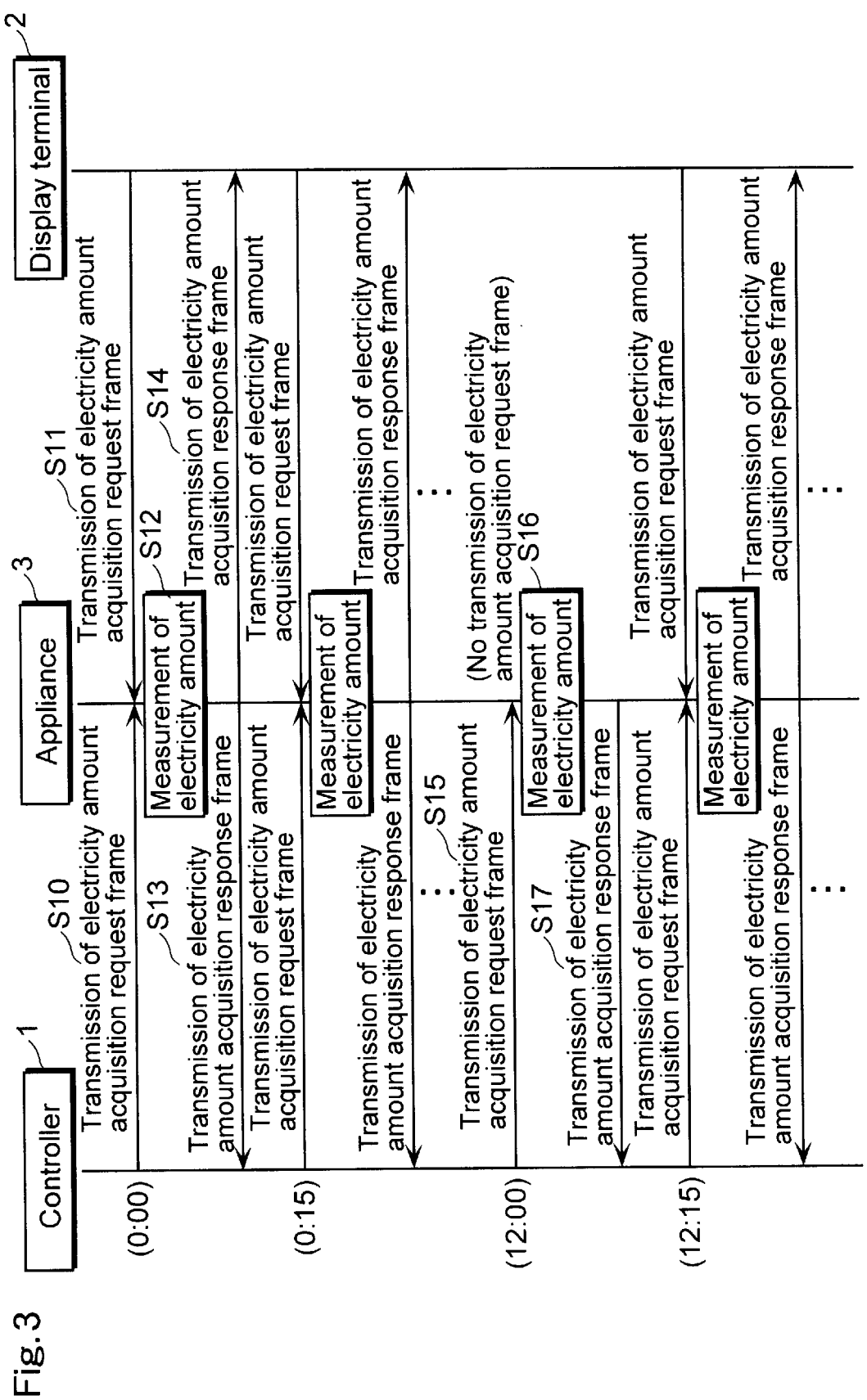
FIG. 3 is a communication sequence diagram when a controller and a display terminal acquire electricity amount data on an appliance.

FIG. 3 is a communication sequence diagram when the controller 1 and the display terminal 2 acquire the electricity amount data on the appliance 3. Moreover, in FIG. 3, the numerals in the parentheses represent "hour:minute" of the time when the electricity amount data is acquired.

For a start, the controller 1 and the display terminal 2 transmit separately a frame that requests to acquire the electricity amount data (hereafter, referred to as "the electricity amount data acquisition request frame") to the appliance 3 when the predetermined time ((0:00), for example) comes (S10, S11). In doing this, the appliance 3 measures its own electricity total amount at the moment (S12), generates a frame that stores the measured electricity amount and responds to the electricity amount acquisition request frame (hereafter, referred to as "the electricity amount data acquisition request frame") and transmits the frame to the controller 1 and the display terminal 2 (S13, S14).

Further, when a certain time from the above-mentioned time (15 minutes from 0:00, for example) has passed, the controller 1 and the display terminal 2 transmit, similarly to the case of "0:00", "the electricity amount data acquisition request frame" to the appliance 3. In doing this, the appliance 3 measures, similarly, its own electricity total amount, generates a frame that stores the value and transmits the frame to the controller 1 and the display terminal 2.

As just described, the controller 1 and the display terminal 2 transmit, at every predetermined time, the electricity amount data acquisition request frames to the appliance 3 and acquire the electricity total amount at that moment from the appliance 3.

Moreover, in the present system 100, even if the case that the display terminal 2 cannot acquire the value of electricity amount of the appliance 3 at a certain time ((12:00), for example) for some reason (the display terminal 2 has moved to another room, for example) happens (the loss happens), the loss of the electricity amount data in the controller 1 is not supposed to happen because the controller 1 acquires the electricity amount data on the appliance 3 at all times (S15~S17).

FIG. 4 is diagrams that show examples of a frame used to acquire the electricity amount data between the controller 1 and the appliance 3. Moreover, in the case of acquiring the electricity amount data between the display terminal and the appliance 2, a similar frame is used. FIG. 4A is a diagram that shows an example of data structure of the electricity amount acquisition request frame transmitted by the controller 1 to the appliance 3.

In FIG. 4A, an electricity amount acquisition request frame 30a is made up of SEA32 that indicates the address of the appliance that transmits this frame, DEA33 that indicates the address of the appliance that receives this frame, EBC34 that indicates the data amount (the number of bytes) after the EBC, OHD31b that stores the header information on the object of this frame, SEOJ35 that indicate the object of the transmitter, DEOJ36 that indicates the object of the receiver, EPC37 that indicates the kinds of data transmitted and received, and ESV38 that represents an operation to EPC37. Moreover, EHD31A is the part in which the header information on the whole of this electricity amount acquisition frame 30a is stored.

FIG. 4B is a diagram that shows an example of data structure of an electricity amount acquisition response frame transmitted by the appliance 3 to the controller 1. The respects in which the electricity amount acquisition response frame in FIG. 4B differs from the above-mentioned electricity amount acquisition request frame are the respect that the contents of SEA32 are contrary to those of DEA33 (namely, the transmitter address is contrary to the receiver address), the respect that the contents of SEOJ35 are contrary to those of DEOJ36 (namely, the receiver object is contrary to the transmitter object), the respect that the contents of ESV38 become "read-out response" from "read-out request", and the respect that EDT39 that is the appliance data of the actual appliance 3 (namely, the value that represents the electricity total amount) are added. Moreover, as for the value of EBC33, by the addition of EDT39, the value to which the data amount of EDT39 (4 bytes) is added is set.

FIG. 5 is a communication sequence diagram in the case of complementing the non-acquired electricity amount data between the display terminal 2 and the controller 1.

Figure 5A:
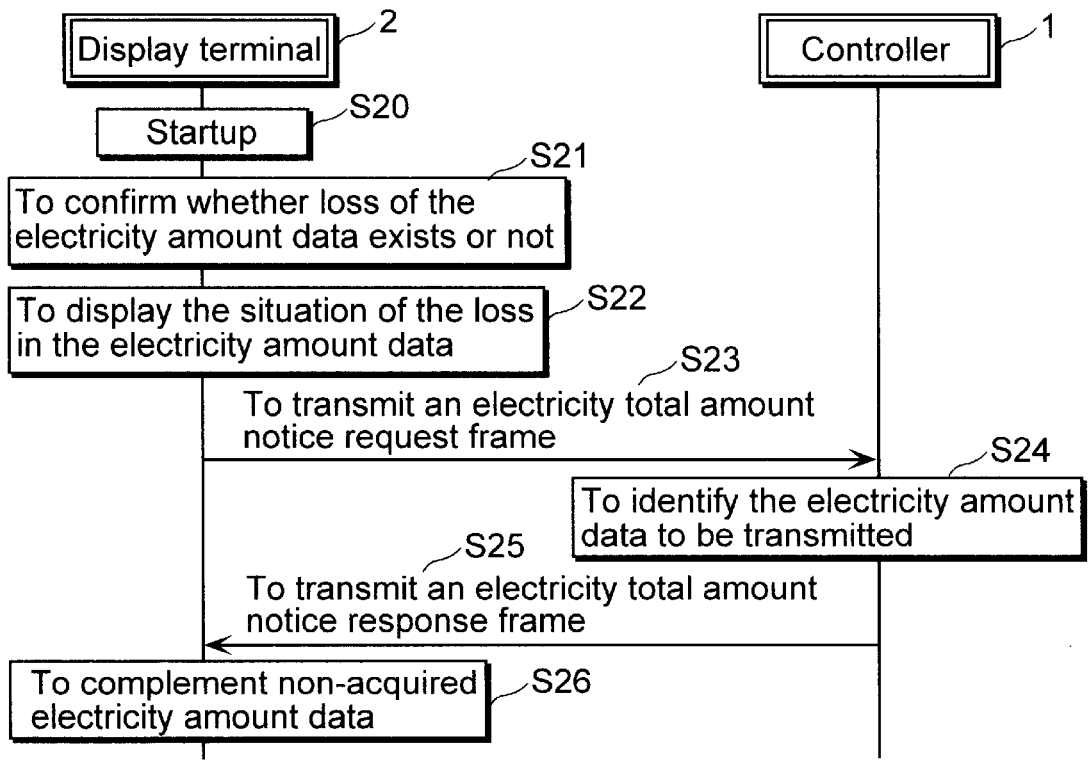
FIG. 5A is a communication sequence diagram when the display terminal complements non-acquired electricity amount data from the controller on startup of the display terminal.

FIG. 5A is a communication sequence diagram when the display terminal 2 complements the non-acquired electricity amount data from the controller 1 at the time when the display terminal 2 starts up.

For a start, when the startup processing unit 9 detects the startup (Power On) of the display terminal 2 (S20), the startup processing unit 9 calls the appliance data loss detection unit 13, which confirms whether loss of the electricity amount data exists or not (S21) and the screen display unit 8 displays the situation of the loss in the electricity amount data (S22).

Next, the appliance data loss detection unit 13 generates "an electricity amount notice request frame" that will be explained later and transmits the frame to the controller 1 through the electric power line communication unit 14 (S23). In doing this, the data complement unit 6 of the controller 1 interprets the contents of the received the electricity amount data notice request frame and identifies the electricity amount data that the data complement unit 6 should transmit to the display terminal 2 (S24). Further, the data complement unit 6 of the controller 1 generates "an electricity amount notice response frame" that stores the identified electricity amount data and transmits the generated frame to the display terminal 2 (S25).

After this, the appliance data loss detection unit 13 of the display terminal 2 complements non-acquired electricity amount data based on the electricity amount data stored in the electricity amount notice response frame received through the electric power line communication unit 14 (S26).

Figure 5B:
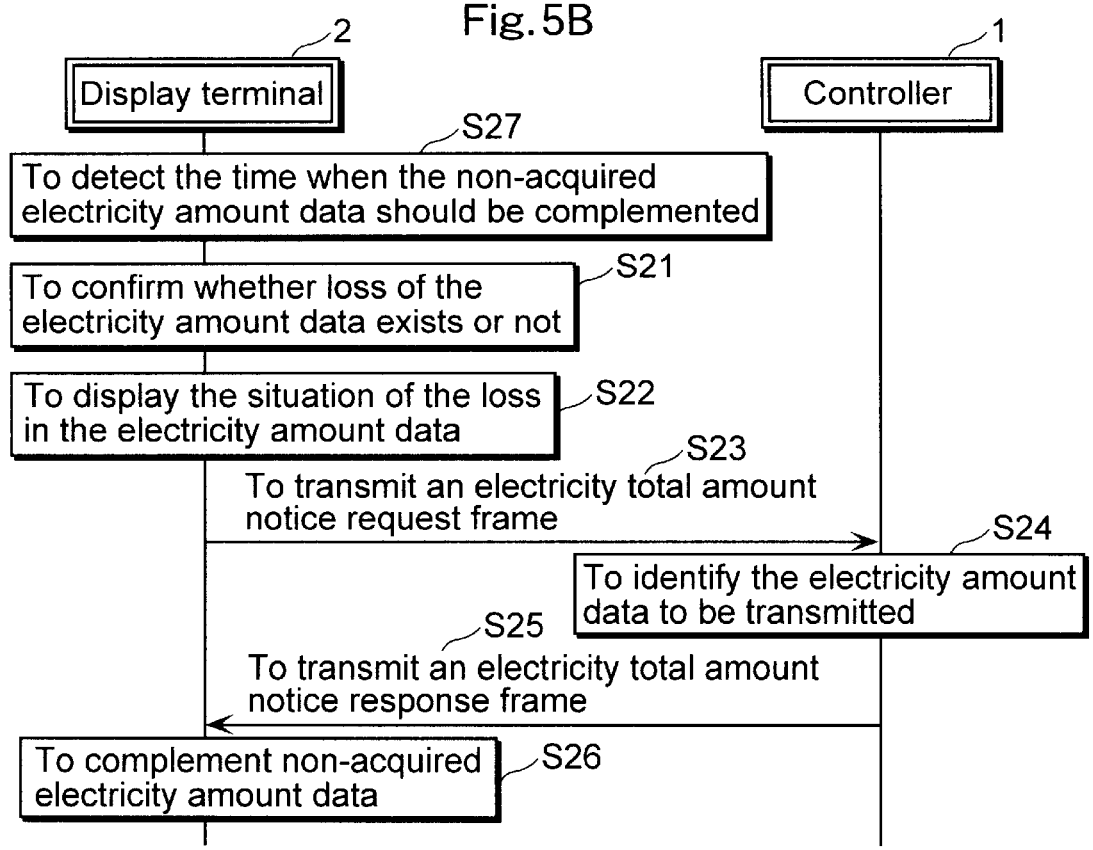
FIG. 5B is a communication sequence diagram when the display terminal complements non-acquired electricity amount data from the controller regularly.

FIG. 5B is a communication sequence diagram when the display terminal 2 complements the non-acquired electricity amount data regularly from the controller 1.

For a start, when the regular time processing unit 10 detects the time when the non-acquired electricity amount data should be complemented ((23:55), for example) (S27), the regular time processing unit 10 calls the appliance data loss detection unit 13, which confirms whether loss of the electricity amount data exists or not (S21) and, the screen display unit 8 displays the situation of the loss in the electricity amount data (S22). Moreover, the processing after this is similar to that of the case that the display terminal 2 starts up shown in FIG. 5A (S23~S26).

FIG. 6 is diagrams that show examples of data structure of a frame in the case of complementing the non-acquired electricity amount data between the display terminal 2 and the controller 1. FIG. 6A is a diagram that shows an example of a frame by which the display terminal 2 requests the controller 1 to notify the electricity amount data for a day (hereafter, referred to as "the electricity amount notice request frame"). Although the basic structure of this electricity amount notice request frame 40a is same as that of the above-mentioned electricity amount acquisition request frame 30a, they are different in the respect that EDT41 is added to the frame 40a. This EDT41 is made up of each data of 2-byte array element number 41a that indicates the date of the electricity amount data ("0x0000" in the case of yesterday and "0x0001" in the case of today) that the display terminal 2 requests to notify, 2-byte "address of the applicable WHM" 42b that indicates the addresses of appliances including measuring instruments and the like that request a notice (a voltmeter, for example), and 3-byte "object of the applicable WHM" 41c that indicates the objects of the measuring instruments and the like that request a notice.

Moreover, in the present frame 40a, "0x00002" that represents the display terminal 2 is stored as the value of the transmitter address SEA32 and "0x00001" that represents the controller 1 is stored as the value of the receiver address DEA33, respectively, and "0x05FE01" that represents the display terminal 2 is stored as the value of the transmitter object SEOJ35 and "0x05FF01" that represents the controller is stored as the value of the receiver object DEOJ36, respectively.

FIG. 6B is a diagram that shows an example of data structure of a frame by which the controller 1 transmits (responds to the above-mentioned request) the electricity amount data for a day to the display terminal 2 (hereafter, referred to as "the electricity amount notice response frame"). The basic structure of this electricity amount notice response frame 40b is same as that of the electricity amount acquisition response frame 30b, but the data structure of EDT42 is different from that of EDT 39. In this EDT42 is stored the electricity total amount value 42d for a day (96 bytes) specified by the electricity amount notice request frame 40a. Here, the number of bytes of the total electricity amount value in EDT42 shows one day's value when it is measured every hour, and when it is measured every 15 minutes, naturally, one day's value becomes four times of the number of bytes (namely, 384 bytes).

Moreover, in this electricity amount notice response frame 40b is stored the array element number 42a, "the address of the WHM" 42b, and "the object of the WHM" 42c but the contents of these data are same as those of the array element number 41a of the EDT41, "the address of the WHM" 41b, and "the object of the WHM" 41c.

Additionally, the contents stored in the transmitter address SEA32 and the receiver address DEA33 and the contents stored in the transmitter object SEOJ35 and the receiver object DEOJ36 in the electricity amount notice response frame 40b are contrary to those of the each transmitter and the each receiver in the electricity amount notice request frame 40a.

FIG. 7 is a diagram that shows an example of data structures of the above-mentioned File 1 and File 2. In FIG. 7, the time when the electricity amount data were acquired (1100~1195) and the electricity amount data (1200~1295) are associated and stored. Like in FIG. 7, if the electricity amount data are acquired every 15 minutes, 96 sets of associated time and electricity amount data for each day are stored.

Next, operations of the appliance data collecting system 100 constructed as is described above are explained referring to figures. The above-mentioned "electricity amount data" is taken up as an example of the appliances data on the appliance 3 and the case of acquiring and complementing the data will be explained below.

Figure 8:
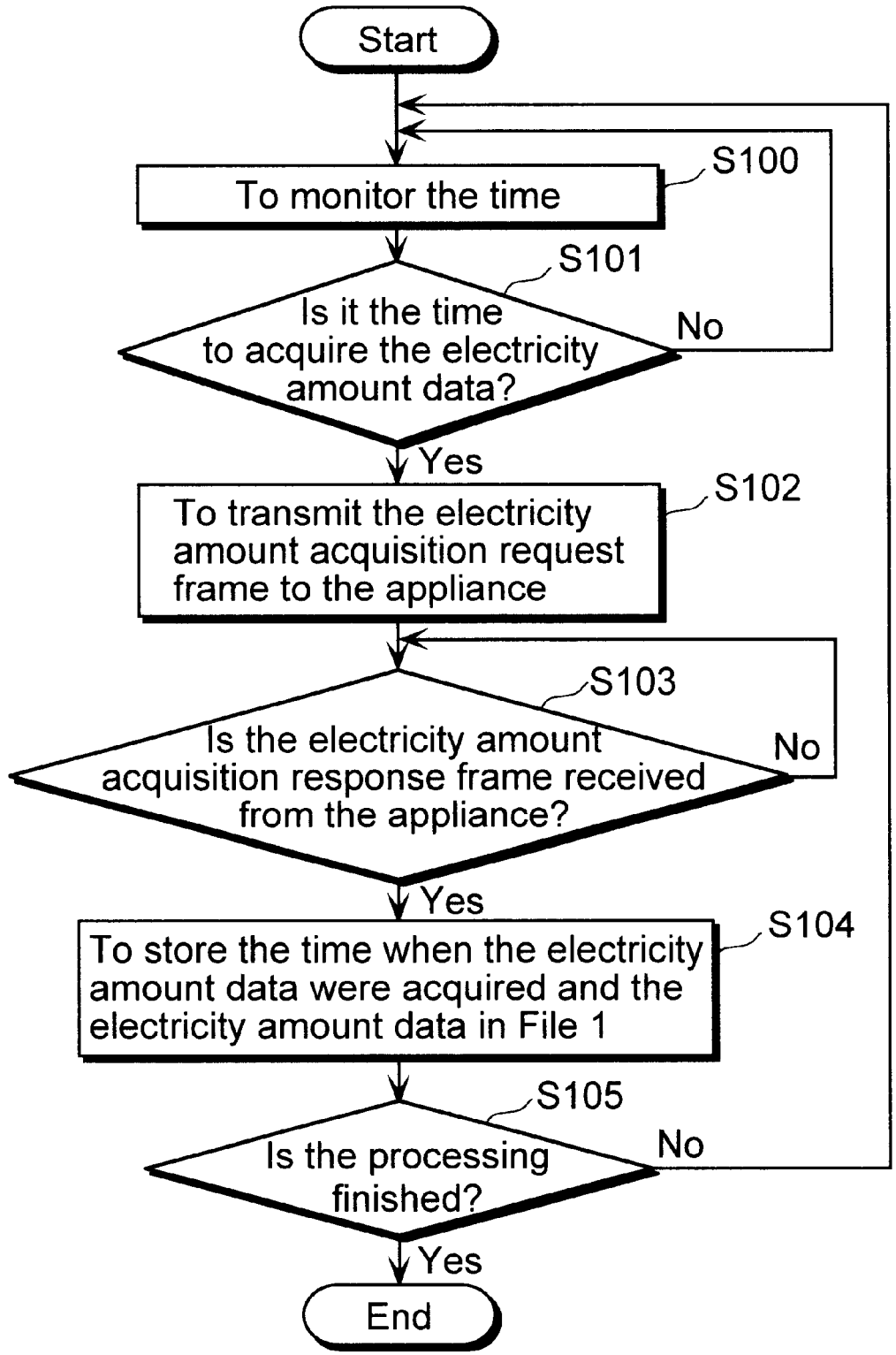
FIG. 8 is a flowchart that shows processing when the controller acquires the electricity amount data from the appliance regularly.

FIG. 8 is a flowchart that shows the process when the controller 1 acquires the electricity amount data from the appliance 3 regularly.

For a start, when the master data holding unit 5 of the controller 1 monitors the passage of time of the built-in clock (S100) and confirms the time to acquire the electricity amount data (S101: Yes), the master data holding unit 5 generates (or reads out from the built-in ROM and the like) the electricity amount acquisition request frame 30a (hereafter, referred to as "the first frame") and transmits this first frame to the appliance 3 through the electric power line communication unit 7 (S102). In this case, the master data holding unit 5 stores the address of the controller 2, the transmitter of the first frame in SEA32 and the address of the appliance 3, the receiver of the first frame in DEA33. Further, the master data holding unit 5 stores the codes that represent the objects of the transmitter and the receiver in SEOJ35 and DEOJ36, respectively, similarly to the case of the above-mentioned SEA32 and DEA33.

Further, when the master data holding unit 5 receives the electricity amount acquisition response frame 30b from the appliance 3 through the electric power line communication unit 7 (S103: Yes), the master data holding unit 5 associates the electricity amount data stored in this electricity amount acquisition response frame 30b with the time when the electricity amount data were acquired and stores the frame 30b associated with the time in File 1 (S104).

Similarly below, the master data holding unit 5 acquires the electricity amount data every 15 minutes and stores them in File 1 (S100~S104).

FIG. 9 is a flowchart that shows the process when the display terminal 2 acquires the electricity amount data from the appliance 3 regularly.

For a start, when the appliance data acquisition unit 11 of the display terminal 2 monitors the passage of time in the clock built in the regular time processing unit 10 (S200) and confirms the time to acquire the electricity amount data (S201: Yes), the appliance data acquisition unit 11 generates the electricity amount acquisition request frame 30a (hereafter, referred to as "the third frame") and transmits the frame 30a to the appliance 3 through the electric power line communication unit 14 (S202). In this case, the appliance data acquisition unit 11 stores the address of the display terminal 2, the transmitter of the third frame in SEA32 and the address of the appliance 3, the receiver of the third frame in DEA33. Further, the appliance data acquisition unit 11 similarly stores the codes that represent the objects of the transmitter and the receiver in SEOJ35 and DEOJ36, respectively.

Furthermore, when the appliance data acquisition unit 11 receives the electricity amount acquisition response frame 30b from the appliance 3 through the electric power line communication unit 14 (S203), the appliance data acquisition unit 11 associates the electricity amount data stored in this electricity amount acquisition response frame 30b with the time when the electricity amount data were acquired and stores the frame 30b associated with the time in File 2 (S204).

Similarly below, the appliance data acquisition unit 11 acquires the electricity amount data every 15 minutes (S200–S204).

FIG. 10 is a flowchart that shows the process when the appliance 3 transmits the electricity amount data to the controller 1 or the display terminal 2.

For a start, when the appliance data providing unit 15 of the appliance 3 receives the electricity amount acquisition request frame 30a (the first frame or the third frame) from the controller 1 or the display terminal 2 through the electric power line communication unit 16 (S300: Yes), the appliance data providing unit 15 measures the value of the electricity total amount data of the appliance 3 at the time and stores the electricity amount data that represent this value of the electricity total amount data into the electricity amount acquisition response frame 30b (S301).

Next, the appliance data providing unit 15 transmits the electricity amount acquisition response frame 30b (hereafter, referred to as "the second frame") to the controller 1 that is the transmitter of the electricity amount acquisition request frame 30a and transmits the electricity amount acquisition response frame 30b (hereafter, referred to as "the fourth frame") also to the display terminal 2 (S302). In this case, the appliance data providing unit 15 stores the address of the appliance 3, the transmitter of the second frame or the fourth frame into SEA32, and the address of the controller 1 or the display terminal 2, the receiver of the second frame or the fourth frame into DEA33, respectively. Similarly, the appliance data providing unit 15 stores the codes of the objects of the transmitter and the receiver into SEOJ35 and DEOJ36 of the second frame or the fourth frame, respectively.

FIG. 11 is a flowchart that shows the processing contents when the process to complement the non-acquired electricity amount data starts while the display terminal 2 displays the electricity amount data on the appliance 3.

For a start, the screen display unit 8 reads out the set of the electricity amount data and the time when the electricity amount data were acquired from File 2 held in the data recording unit 12 based on an instruction of the user (S400) and displays the electricity amount data for a day on the screen (S401). At this conjuncture, FIG. 12 indicates an example of contents displayed on the screen. FIG. 12 indicates that the electricity amount data at 12:00 and 13:00 are not acquired.

Next, when the regular time processing unit 10 monitors the passage of time of the built-in clock and detects the time when the non-collected data should be complemented, the regular time processing unit 10 calls the appliance data loss detection unit 13, which checks whether the loss of the electricity amount data exists or not (S402). If there is the loss of the electricity amount data (S403: Yes), the appliance data loss detection unit 13 generates an electricity amount notice request frame (hereafter, referred to as "the fifth frame") and transmits the fifth frame to the controller 1 through the electric power line communication unit 14 (S404).

After this, when the appliance data loss detection unit 13 receives an electricity amount notice response frame (hereafter, referred to as "the sixth frame") that responds to the fifth frame from the controller 1 through the electric power line communication unit 14 (S405: Yes), the appliance data loss detection unit 13 stores (or complements) the non-acquired electricity amount data in File 2 in the data recording unit 12, referring to the sixth frame (S406). In doing this, the screen display unit 8 can also displays the complemented electricity amount data (S407).

Moreover, when the appliance data acquisition unit 11 does not receive the sixth frame from the controller 1 after the predetermined time has passed (S408:Yes), the appliance data acquisition unit 11 instructs the screen display 8 to display an error (409).

FIG. 13 is a flowchart that shows the process when the controller 1 receives the fifth frame from the display terminal 2.

For a start, when the data complement unit 6 receives the fifth frame through the electric power line communication 7 (S500: Yes), the data complement unit 6 interprets the contents of the fifth frame (S501) and based on the result reads out the electricity amount data that should be transmitted by File 1 held in the master data holding unit 5 (S502). Next, the data complement unit 6 generates the sixth frame storing the read-out electricity amount data (S503) and transmits the sixth frame to the display terminal 2 through the electric power line communication 7 (S504).

FIG. 14 is a flowchart that shows the process when the display terminal 2 acquires the non-acquired electricity amount data on startup from the controller 1.

For a start, when the startup processing unit 9 detects the startup of the display terminal 2 (S600: Yes), the startup processing unit 9 calls the appliance data loss detection unit 13, which reads out from File 2 the electricity amount data and the time when they were acquired (S601) and checks whether the loss of the electricity amount data exists or not (S602). If there is the loss of electricity amount data (S603: Yes), the appliance data loss detection unit 13 generates an electricity amount notice request frame (hereafter, referred to as "the seventh frame") to request the notice of the electricity amount data and transmits the seventh frame to the controller 1 through the electric power line communication unit 14 (S604).

After this, when the appliance data loss detection unit 13 receives the electricity amount notice response frame (hereafter, referred to as "the eighth frame") from the controller 1 through the electric power communication unit 14 (S605: Yes), the appliance data loss detection unit 13 complements the non-acquired electricity amount data in File 2 (S606).

FIG. 15 is a flowchart that shows the process when the display terminal 2 acquires the non-acquired electricity amount data regularly from the controller 1.

For a start, when the regular time processing unit 10 monitors the passage of the time of the built-in clock (S700) and confirms the time when the non-acquired electricity amount data should be complemented (S701: Yes), the regular time processing unit 10 calls the appliance data loss detection unit 13, which reads out from File 2 the electricity amount data and the time when they were acquired (S702) and checks whether the loss of the electricity amount data exists or not (S703). If there is the loss of electricity amount data (S704: Yes), the appliance data loss detection unit 13 generates an electricity amount notice request frame (hereafter, referred to as "the ninth frame") and transmits the ninth frame to the controller 1 through the electric power line communication unit 14 (S705).

After this, when the appliance data loss detection unit 13 receives the electricity amount notice response frame (hereafter, referred to as "the tenth frame") from the controller 1 through the electric power communication unit 14 (S706: Yes), the appliance data loss detection unit 13 complements the non-acquired electricity amount data in File 2 (S707).

As is described above, the display device 2 of the appliance data collecting system 100 according to the present embodiment can not only acquire the appliance data from the appliance 3 but also complement and display the appliance data from the controller 1.

Moreover, in the first embodiment, as is described above, a working example in which the appliance data are acquired using the first~tenth frames is indicated but the working example is not limited to the frames. Consequently, it is possible to construct the appliance data collecting system according to the present invention to execute the above-mentioned acquisition using a data frame (or a data packet) with a simpler data structure.

FIG. 16 is diagrams that show examples of the data frame with a simpler data structure. FIG. 16A is a diagram that shows a data structure example of a data frame that simplifies the first frame (namely, the frame at the request side of the appliance data) according to the first embodiment. This data frame stores in the header unit the transmitter address 1000 that indicates the address that can identify the transmitter appliance (the controller 1 or the display terminal 2, for example) and the receiver address 1001 that indicates the address that can identify the receiver appliance (the appliance 3, for example) and stores in the data unit the code that represents the appliance data acquisition request 1002 that requests to return the appliance data on the appliance that is the receiver of this data frame. The data amount (the number of bytes) of the above-mentioned addresses and the above-mentioned request is supposed to be 1 to several bytes, for example.

FIG. 16B is a diagram that shows a data structure example of a data frame that simplifies the second frame (namely, the frame at the response side of the appliance data) according to the first embodiment. This data frame stores in the header unit the transmitter address 1003 that indicates the address that can identify the transmitter appliance (the appliance 3, for example) and the receiver address 1004 that indicates the address that can identify the receiver appliance (the controller 1 or the display terminal 2, for example) and stores the electricity total amount data of the appliance 1005 in the data unit. The data amount (the number of bytes) of the above-mentioned addresses and the above-mentioned request is supposed to be 1 to several hundreds of bytes, for example.

FIG. 17 is diagrams that show examples of a data frame with a simpler data structure used in the case of complementing the appliance data. FIG. 17A is a diagram that shows an example of data structure of the data frame that simplifies the fifth frame (namely, the electricity amount notice request frame) according to the first embodiment. This data frame stores in the header unit the transmitter address 1006 that indicates the address that can identify the transmitter appliance (the display terminal 2) and the receiver address 1007 that indicates the address that can identify the receiver appliance (the appliance 3, for example) and stores in the data unit the code that represents the electricity total amount data acquisition request 1008 that requests to return the electricity total amount data of the appliance that is the receiver of this data frame and the information 1009 that represents the time of the electricity total amount data that the user wants to acquire. The data amount (the number of bytes) of the above-mentioned addresses and the above-mentioned request is supposed to be 1 to several bytes, for example.

FIG. 17B is a diagram that shows an example of data structure of the data frame that simplifies the sixth frame (namely, the electricity amount notice response frame) according to the first embodiment. This data frame stores in the header unit the transmitter address 1010 that indicates the address that can identify the transmitter appliance (the appliance 3, for example) and the receiver address 1011 that indicates the address that can identify the receiver appliance (the display terminal 2, for example) and stores the electricity total amount data of the appliance 1012 in the data unit. The data amount (the number of bytes) of the above-mentioned addresses and the above-mentioned data is supposed to be 1 to several hundreds of bytes, for example.

Additionally, in the first embodiment, a working example in which the complement of the non-acquired appliance data is executed regularly (at 23:55 everyday, for example) and automatically is indicated but it is possible to construct the appliance data collecting system according to the present invention to execute the complement by an instruction from the user.

Further, in the first embodiment, a working example in which the transmitter address, the receiver address, the transmitter object and the receiver object in the frames that each device transmits are set in the master data holding unit 5, the appliance data acquisition unit 11 and the appliance data providing unit 15 is explained, but naturally, it is acceptable that the above-mentioned addresses and the above-mentioned objects of each frame are set in the electric power communication units 7, 14, and 16.

(The Second Embodiment)

In the second embodiment, a working example of correcting the time that is one of the important appliance data to collect the non-acquired appliance data with reliability in the appliance data collecting system is explained.

FIG. 18 is a block diagram that shows the structure of the appliance data collecting system 200 according to the present embodiment and the functional structure of each device. As is shown in FIG. 18, the present system 200, similarly to the appliance data collecting system 100 according to the first embodiment, is equipped with a controller 19, a display terminal 20 and an appliance 3 and each device is connected through an electric power line 4. The respect in which this appliance data collecting system 200 is different from the appliance data collecting system 100 is the respect that a center server 17 is set outdoors. Moreover, the same structure as that of the first embodiment is given the same letter symbol and its explanation is omitted below.

The display terminal 20 is equipped with a display terminal time setting unit 23 adding to the structure of the display terminal 2 according to the first embodiment. The display terminal time setting unit 23 generates a frame that requests the controller 19 to notify the display terminal 20 of the current time (hereafter, referred to as "the display terminal time setting request frame") and transmits the frame to the controller 19 through the electric power line communication unit 14 by an instruction of the startup processing unit 9 on startup or an instruction of the regular time processing unit 10 regularly.

The controller 19 is equipped with a controller time setting unit 22 adding to the structure of the controller 1 according to the first embodiment. When this controller time setting unit 22 receives the display terminal time setting request frame from the display terminal 20, the controller time setting unit 22 generates a frame storing the time information that indicates the current time of the clock built in the master data holding unit 5 (hereafter, referred to as "the display terminal time setting response frame") and transmits this frame to the display terminal 20. Further, the controller time setting unit 22 has a function to synchronize the time with the center server 17.

The center server 17 is a server that has a communication function owned by the specified outdoor service companies (such as an ISP (Internet Service Provider) and a security service company) and is equipped with a built-in clock (that is not shown in FIG. 18) and a time setting request unit 21. The center server 17 is connected to the controller 19 through the communication line 18. The communication protocol in this case is supposed to be TCP/IP, for example. When the time setting request unit 21 receives a packet including time information from the controller 19, the time setting request unit 21 compares the received time information with the time of the clock built in the center server 17 and if there is a difference more than the predetermined time (5 minutes, for example), the time setting request unit 21 generates a packet storing the time information that indicates the current time of the clock built in the center server 17 and transmits this packet to the controller 19.

FIG. 19 is communication sequence diagrams to synchronize the time between the display terminal 20 and the controller 19.

Figure 19A:
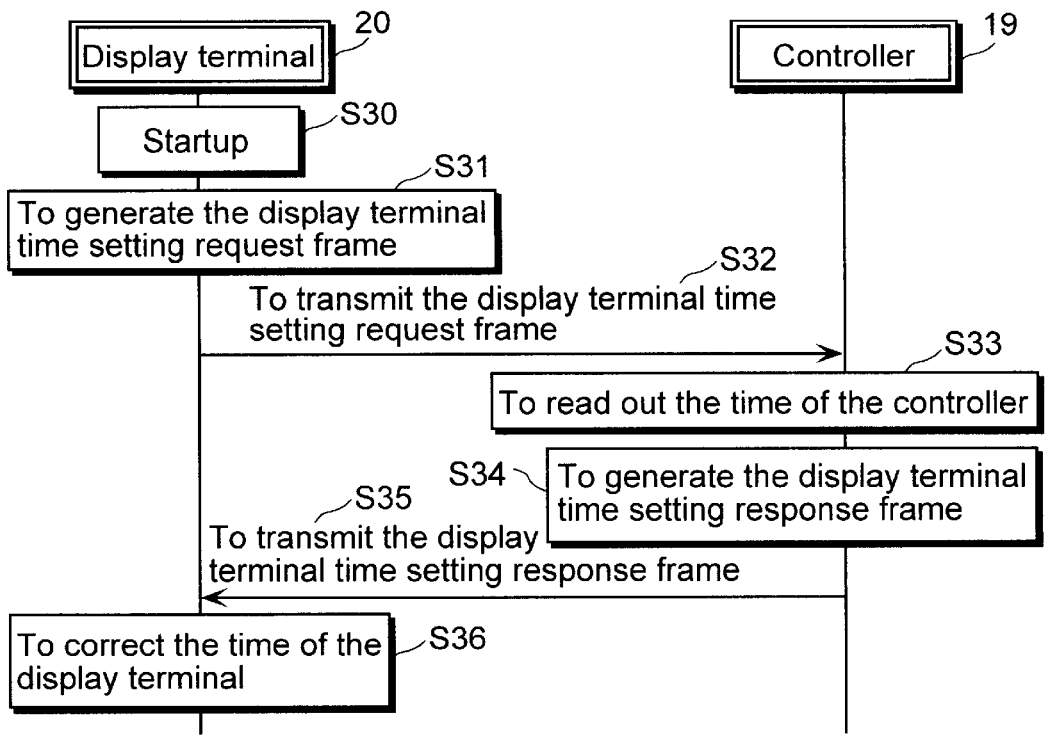
FIG. 19A is a communication sequence diagram when the display terminal synchronizes the time with the controller on startup of the display terminal.

FIG. 19A is a communication sequence diagram when the display terminal 20 synchronizes the time with the controller 19 on startup of the display terminal 20.

For a start, when the startup processing unit 9 of the display terminal 20 detects the "Power On" of the display terminal 20 (S30), the startup processing unit 9 calls the display terminal time setting unit 23, which generates the display terminal time setting request frame (S31) and transmits the frame to the controller 19 through the electric power line communication 14 (S32). In doing this, the controller 19 interprets the contents of the received display terminal time setting request frame, reads out the current time from the clock built in the master data holding unit (S33), stores the information that indicates this time into the display terminal time setting response frame (S34) and transmits the frame to the display terminal 20 through the electric power line communication unit 7 (S35).

After this, the display terminal time setting unit 23 of the display terminal 20 instructs the regular time processing unit 10 to correct the time of the clock based on the information that indicates the time stored in the received display terminal time setting response frame (S36).

Figure 19B:
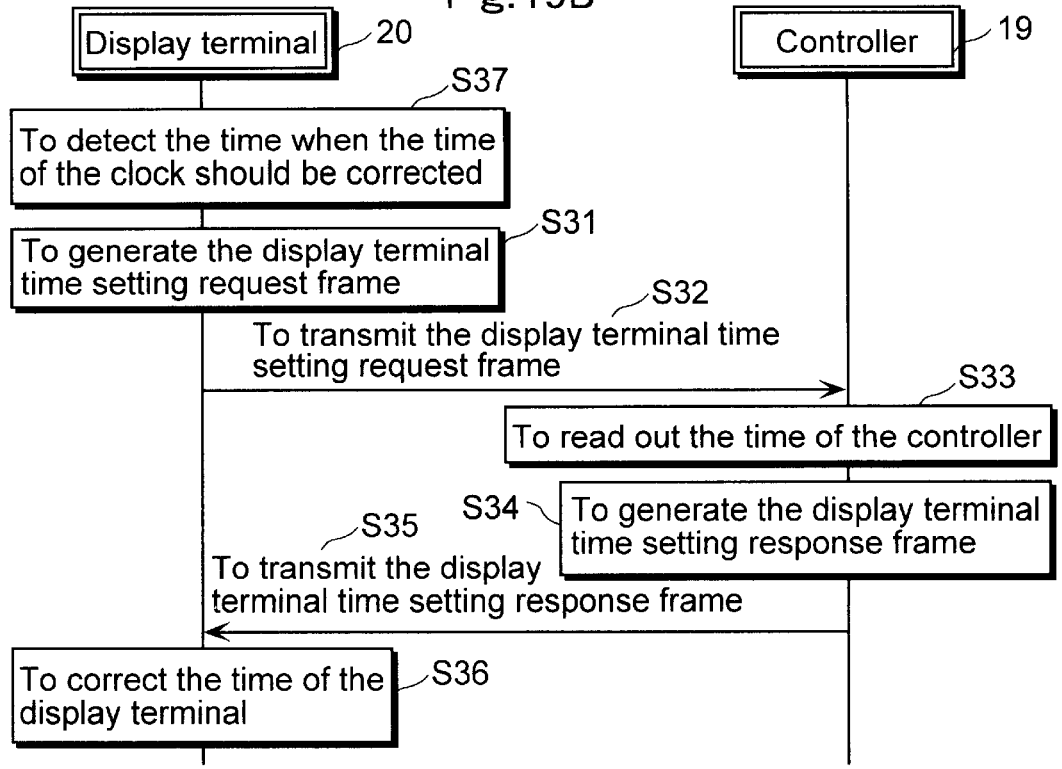
FIG. 19B is a communication sequence diagram when the display terminal synchronizes the time with the controller regularly.

FIG. 19B is a communication sequence diagram when the display terminal 20 synchronizes the time with the controller 19 regularly.

For a start, when the regular time processing unit 10 of the display terminal 20 detects the time when the time of the clock should be corrected (23:55, for example) (S37), the regular time processing unit 10 calls the display terminal time setting unit 23, which generates the display terminal time setting request frame (S31) and transmits the frame to the controller 19 through the electric power line communication unit 14 (S32). Moreover, the processing after this is similar to that of FIG. 19A (S33~S36).

Figure 20:
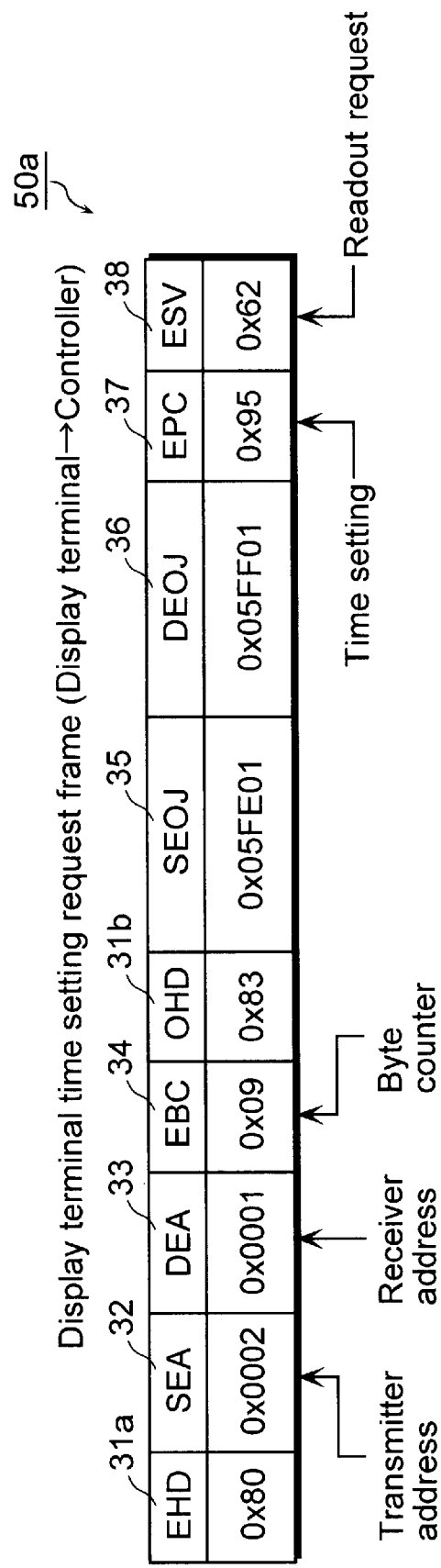
FIG. 20 is a diagram that shows an example of data structure of a display terminal time setting request frame transmitted by the display terminal to the controller.

FIG. 20 is a diagram that shows an example of data structure of a display terminal time setting request frame transmitted by the display terminal 20 to the controller 19. The basic structure of this display terminal time setting request frame 50a is same as that of the electricity amount notice request frame 40a. But the respect that EPC37 indicates "time setting" while ESV38 indicates "read-out request" is different.

FIG. 21 is diagrams that show examples of data structure of frames transmitted by the controller 19 to the display terminal 20. FIG. 21A and FIG. 21B are diagrams that show the examples of data structure of the display terminal time setting response frames transmitted by the controller 19 to the display terminal 20. The basic structures of these frames are same as that of the electricity amount notice response frame 40b. But in the display terminal time setting response frame 50b shown in FIG. 21A, EPC37 indicates "time setting (year, month, day)", ESV38 indicates "No notice response" and EDT51 stores information that indicates the date (year, month, day).

Additionally, the display terminal time setting response frame 50c shown in FIG. 21B is basically same as the above-mentioned display terminal time setting response frame 50b, but the respect that EPC37 indicates "time setting (hour, minute)" while EDT52 stores data that represents "hour, minute" (and the value of EBC34) is different.

FIG. 22 is communication sequence diagrams to synchronize the time between the controller 19 and the center server 17.

Figure 22A:
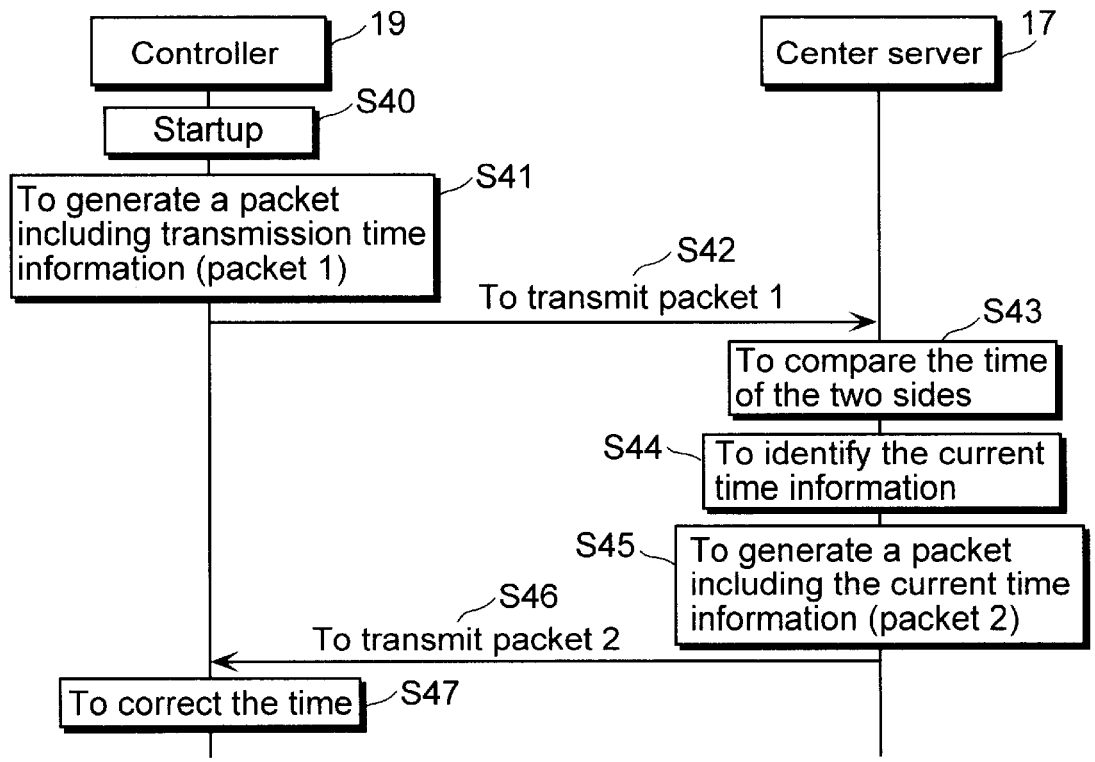
FIG. 22A is a communication sequence diagram when the controller synchronizes the time with the center server on startup of the controller.

FIG. 22A is a communication sequence diagram when the controller 19 synchronizes the time with the center server 17 on startup of the controller 19.

For a start, when the controller time setting unit 22 of the controller 19 detects "Power On" of the controller 19 (S40), the controller time setting unit 22 generates a packet including transmission time information that indicates the current time of the clock built in the master data holding unit (hereafter, referred to as "packet 1") (S41) and transmits packet 1 to the center server 17 through the communication line 18 (S42). In doing this the time setting request unit 21 of the center server 17 interprets the contents of the received packet 1 and compares the time of the clock built in the center server 17 and the time of the controller 19 (S43). Further, when there is a time difference that is more than the predetermined time (5 minutes, for example) in the compared result, the time setting request unit 21 identifies the current time information that indicates the current time of the clock built in the center server 17 (S44), generates a packet including the current time information (hereafter, referred to as "packet 2") (S45) and transmits packet 2 to the controller 19 through the communication line 18 (S46).

After this, the controller time setting unit 22 of the controller 19 instructs the master data holding unit 5 to correct the time of the built-in clock based on the current time information stored in the received packet 2 (S47).

Figure 22B:
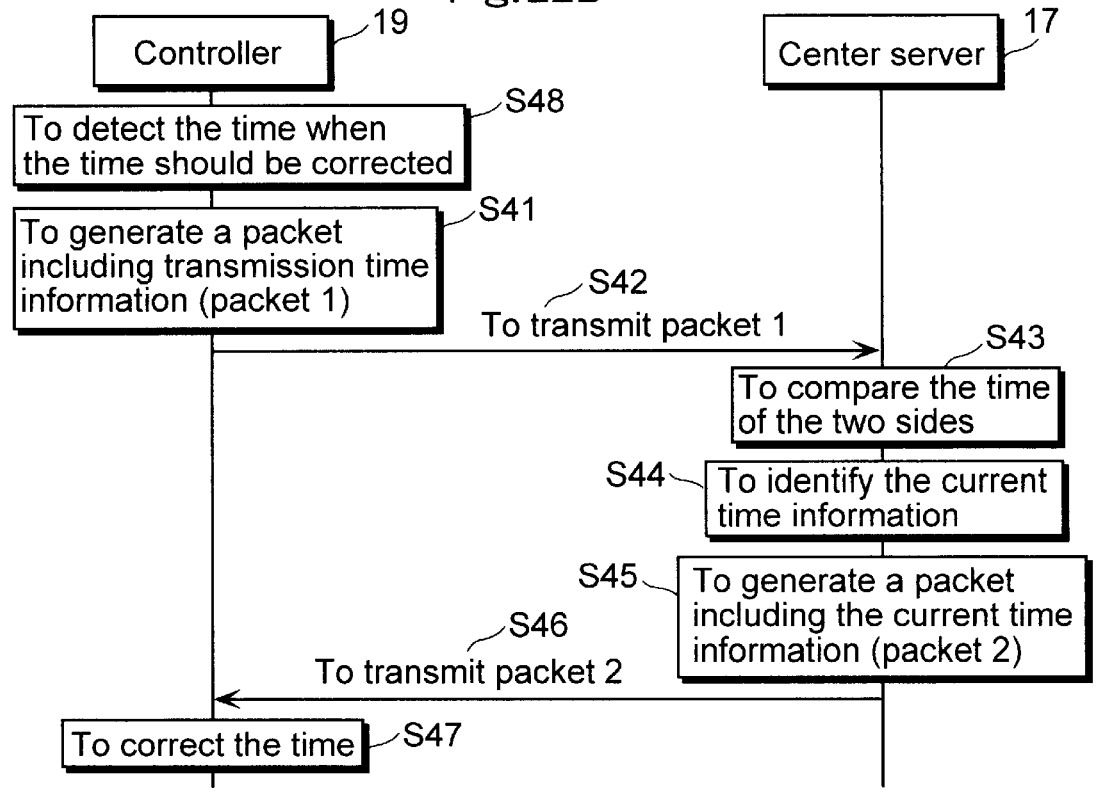
FIG. 22B is a communication sequence diagram when the controller synchronizes the time with the center server regularly.

FIG. 22B is a communication sequence diagram when the controller 19 synchronizes the time with the center server 17 regularly.

For a start, when the controller time setting unit 22 of the controller 19 detects the time when the time of the built-in clock should be corrected (23:55, for example) following the time of the clock built-in the master data holding unit 5 (S48), the controller time setting unit 22 generates the above-mentioned packet 1 (S41) and transmits packet 1 to the center server 17 through the communication line 18 (S42). Moreover, the processing after this is similar to that of FIG. 22A (S43~S47).

Figure 23A:
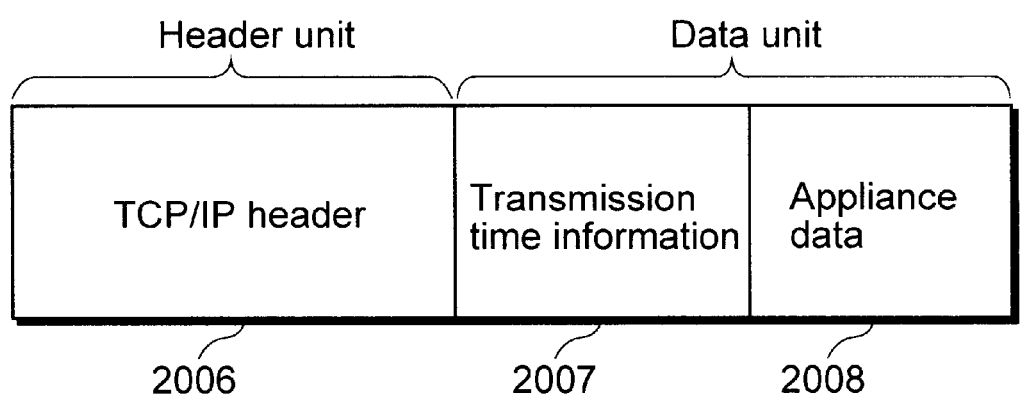
FIG. 23A is a diagram that shows an example of data structure of packet 1.

FIG. 23 is structure examples of packet 1 and packet 2. FIG. 23A is a diagram that shows an example of data structure of packet 1. The header unit includes TCP/IP header 2006 in which the address and the like of the center server, the receiver of packet 1 are written while the transmission time information 2007 of the data unit stores the time when packet 1 is transmitted and the built-in clock of the controller 19 indicates. Moreover, the appliance data

2008 store the appliance data (the electricity amount data, for example) and are used by the center server 17 together with the above-mentioned time.

Figure 23B:
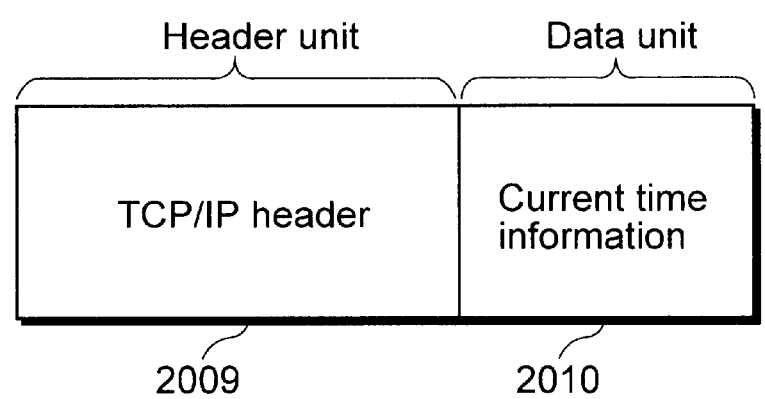
FIG. 23B is a diagram that shows an example of data structure of packet 2.

FIG. 23B is a diagram that shows an example of data structure of packet 2. The header unit stores, similarly to packet 1, TCP/IP header 2009 in which the address and the like of the controller 19, the receiver of packet 2 are written while the current time information 2010 of the data unit stores the time when packet 2 is transmitted and the clock built in the center server 17 indicates.

FIG. 24 is a flowchart that shows processing when the display terminal 20 synchronizes the time with the controller 19 on startup of the display terminal 20.

For a start, when the startup processing unit 9 detects the startup of the display terminal 20 (S800), the startup processing unit 9 calls the display terminal time setting unit 23, which generates a display terminal time setting request frame (hereafter, referred to as "the 11th frame") and transmits the 11th frame to the controller 19 through the electric power line communication unit 14 (S801).

Next, when the display terminal time setting unit 23 receives a display terminal time setting response frame (hereafter, referred to as "the 12th frame") from the controller 19 through the electric power line communication 14 within the predetermined period of time (S802), the display terminal time setting unit 23 extracts the time information of the controller 19 stored in the 12th frame and instructs the regular time processing unit 10 to correct the time of the clock built in the regular time processing unit 10 based on this time. (S803).

FIG. 25 is a flowchart that shows processing when the display terminal 20 synchronizes the time with the controller 19 regularly.

For a start, when the regular time processing unit 10 monitors the passage of the time of the built-in clock (S900) and confirms the time when the time should be corrected (S901), the regular time processing unit 10 calls the display terminal time setting unit 23, which generate a display terminal time setting request frame (hereafter, referred to as "the 13th frame") and transmits the 13th frame to the controller 19 through the electric power line communication unit 14 (S902).

Next, when the display terminal time setting unit 23 receives a display terminal time setting response frame (hereafter, referred to as "the 14th frame") from the controller 19 through the electric power line communication unit 14 within the predetermined period of time (S903), the display terminal time setting unit 23 extracts the time information of the controller 19 stored in the 14th frame and instructs the regular time processing unit 10 to correct the time of the clock built in the regular time processing unit 10 based on this time (S904).

FIG. 26 is a flowchart that shows processing when the controller 19 synchronizes the time with the display terminal 20.

For a start, when the controller time setting unit 22 receives 11th frame or 13th frame from the display terminal 20 through the electric power line communication unit (S1000), the controller time setting unit 22 stores information that indicates the current time of the built-in clock in EDT51 (or EDT52) of the 12th frame or 14th frame. Further, the controller time setting unit 22 generates the 12th frame as a response frame in the case of receiving the 11th frame and the 14th frame as a response frame in the case of receiving the 13th frame (S1001) and transmits the 12th frame or 14th frame to the display terminal 20 through the electric power line communication unit 7 (S1002).

FIG. 27 is a flowchart that shows processing when the controller 19 acquires current time information from the center server 17 and sets the correct time.

For a start, the controller time setting unit 22 transmits a packet including time information at the time of the transmission (packet 1) to the center server 17 (S1100).

Next, when the controller time setting unit 22 receives a packet requesting to set the time (packet 2) from the center server 17 (S1101, Yes), the controller time setting unit 22 extracts the current time information 2010 stored in packet 2 and instructs the master data holding unit 5 to correct the time of the clock built-in the master data holding unit 5 based on this time (S1102).

Moreover, when the controller time setting unit 22 does not receive a packet requesting to set the time (packet 2) from the center server 17 after the predetermined time has passed (S1101: No, S1104: No), the controller time setting unit 22 ends the present processing (S1103: Yes).

FIG. 28 is a flowchart that shows processing when the center server 17 requests the controller 19 to set the time.

For a start, when the time setting request unit 21 receives packet 1 from the controller 19 (S1200: Yes), the time setting request unit 21 acquires the transmission time information 2007 included in packet 1 (S1201). Further, the time setting request unit 21 compares the transmission time information 2007 with the time of the clock built in the center server 17 and if there is a difference more than the predetermined time (S1202: Yes), the time setting request unit 21 stores the current time of the built-in clock in packet 2 (S1203) and transmits packet 2 to the controller 19 through the communication line 18 (S1204).

Moreover, in the second embodiment, as is described above, a working example in which the time of the display terminal 20 is corrected using 11th~14th frames, but what is used to make the above-mentioned time correction is not limited to the frames. Consequently, it is possible to construct the appliance data collection system according to the present invention to correct the time using a data frame (or a data packet) with a simpler data structure.

Figure 29A:
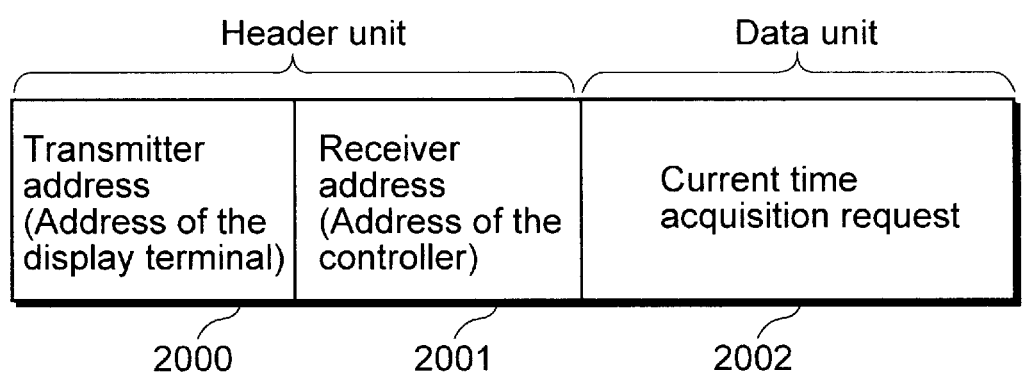
FIG. 29A is a diagram that shows an example of data structure of data frame that simplifies the 11th frame.

FIG. 29 is diagrams that show examples of data frames with simpler data structures. FIG. 29A is a diagram that shows an example of data structure of data frame that simplifies the 11th frame or the 13th frame (namely, a display terminal time setting request frame) in the second embodiment. This data frame stores the transmitter address (in this case, the address of the display terminal 20) 2000 that indicates an identifier that can identify the transmitter and the receiver address (in this case, the address of the controller 19) 2001 that indicates an identifier that can identify the receiver in the header unit and stores a code that represents the current time acquisition request 2002 that requests to return the current time information that indicates the current time of the controller 19 as a response in the data unit. The data amount (the number of bytes) of the above-mentioned addresses and the above-mentioned request is supposed to be 1 to several bytes, for example.

Figure 29B:
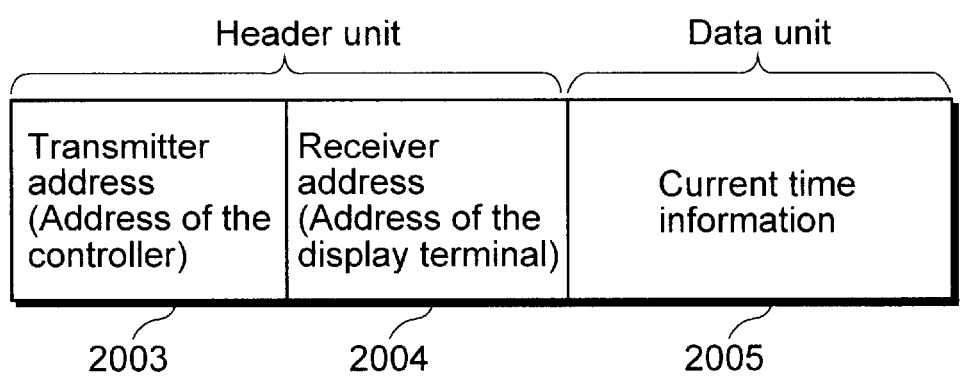
FIG. 29B is a diagram that shows an example of data structure of data frame that simplifies the 12th frame or 14th frame.

FIG. 29B is a diagram that shows an example of data structure of data frame that simplifies the 12th frame or 14th frame (namely, a display terminal time setting response frame) in the first embodiment. This data frame stores the transmitter address (in this case, the address of the controller 19) 2003 that indicates an identifier that can identify the transmitter and the receiver address (in this case, the address of the display terminal) 2004 that indicates an identifier that can identify the receiver in the header unit and stores the current time information 2005 that represents the current time of the controller 19 in the data unit. The data amount (the number of bytes) of the above-mentioned addresses and the above-mentioned request is supposed to be 1 to ten-odd bytes, for example.

As is described above, the display terminal of the appliance data collecting system according to the present embodiment can correct the time of its own built-in clock based on the time of the clock built in the controller. Further, the controller can correct the time of its own built-in clock based on the time of the clock built in the center server.

(The Third Embodiment)

In the third embodiment, a working example in the case of collecting data on the user's operations as an example of the appliance data and of losing the data in the appliance data collecting system is explained.

FIG. 30 is a block diagram that shows a structure of the data collecting system 300 according to the third embodiment and the functional structures of each device. As is shown in FIG. 30, the present system 300, similarly to the appliance data collecting system 200 according to the second embodiment, is equipped with a controller 24, a display terminal 25, a center server 28 and an appliance 3 and each device is connected through an electric power line 4 or a communication line 18 The respect in which this appliance data collecting system 300 is different from the appliance data collecting system 200 is the respect that the controller 24 is equipped with a display terminal operation history holding unit 26, the display terminal 25 is equipped with a display terminal operation history transmission unit 27 and the center server 28 is equipped with a display terminal operation history reception unit 29. Further, the function of data recording unit 12c is partially added. Moreover, the same structure as those of the first and the second embodiments is given the same letter symbol and its explanation is omitted below.

The data recording unit 12c of the display terminal 25, adding the function of the data recording unit 12, holds information that represents history of operations received from the user through the screen display unit 8 (hereafter, referred to as "the operation history information") in an operation history information file (hereafter, referred as "File 3"). As for this operation history, for example, the kinds or its times of the screen referred to in one hour fit into the category.

The display terminal operation history transmission unit 27 of the display terminal 25 reads out the operation history information from File 3 recorded in the data recording unit 12c every startup of the display terminal 25 or every predetermined time (23:55, for example) by an instruction of the startup processing unit 9 or the regular time processing unit 10, generates a frame including this operation history information (hereafter, referred to as "the 15th frame) and transmits the 15th frame to the controller 24 through the electric power line communication unit 14.

The display terminal operation history holding unit 26 of the controller 24 extracts the operation history information stored in the 15th frame received from the display terminal 25 and holds this operation history information in an operation history information master file (hereafter, referred to as "File 4"). Further, this display terminal operation history holding unit 26, regularly or as necessary, transmits a frame storing this operation history information to the center server 28 through the communication line 18.

The display terminal operation history reception unit 29 of the center server 28 extracts the operation history information from the packet received from the controller 24 and acquires user's operation situation and the like at the display terminal 25 from this operation history information.

Moreover, even if the display terminal 25 cannot hold the operation history information for a long time because of the limited storage capacity of the data recording unit 12c, the display terminal 25 can refer to the operation history information and make a display when the controller 24 holds the operation history information for a long time.

FIG. 31 is a diagram that shows an example of data structure of the above-mentioned File 3. As is shown in FIG. 31, the operation history information is grouped into every block and stored (the display terminal operation history blocks 3000–3023). In this display terminal operation history block, the operation history information acquired every hour is recorded. In an example of FIG. 31, 24 hours' operation history information can be held in a display terminal operation history block.

FIG. 32 is a diagram that shows an example of a format of the 15th frame. The address of the display terminal 25, the transmitter is stored in the transmitter address 3024 and the address of the controller 24, the receiver is stored in the receiver address 3025 in the 15th frame's header unit. Further, the operation history information of the display terminal 25 is stored in the operation history information 3026 in the 15th frame's data unit.

Next, the operations of the appliance data collecting system 300 constructed as above are explained. Moreover, since the operation to exchange the operation history information in the appliance data collecting system 300 is basically same as the operation to exchange the time information in the appliance data collecting system 200 according to the second embodiment, the explanation focuses on the different operations.

For a start, when the display terminal operation history transmission unit 27 is called by the startup processing unit 9 or the regular time processing unit 10, the display terminal operation history transmission unit 27 reads out the operation history information from File 3 and transmits a frame including the operation history information (hereafter, referred to as "the 15th frame") to the controller 24 through the electric power line communication unit 14.

In doing this, when the display terminal operation history holding unit 26 of the controller 24 receives the 15th frame through the electric power line communication 7, the display terminal operation history holding unit 26 interprets the 15th frame, extracts the operation history information 3026 included in the 15th frame's data unit and writes this operation history information into File 4. Further, the display terminal operation history holding unit 26 transmits the predetermined unit (for one week, for example) of the operation history information or the unit of the operation history information specified by the center server 28 to the center server 28 through the communication line 18 regularly (at 23:55 every Sunday, for example) or following the request from the center server 28.

Moreover, in the appliance data collection system 300 according to the third embodiment, the time setting request unit 21, the controller time setting unit 22 and the display terminal time setting unit 23 that synchronize the time among each device in the appliance data collection system 200 according to the second embodiment are omitted, but naturally it is acceptable to construct the appliance data collection system 300 to be equipped with those functions.

Additionally, in the first embodiment a working example in which the electric amount data are exchanged using the electric power line communication mode is indicated, but what are exchanged are not limited to the electricity amount data and it is acceptable that data on the used hours, the number of the operations and the like are exchanged.

Furthermore, the data quantity of the electricity amount data to be stored is 96 sets but it is apparent that the number other than 96 is acceptable.

Additionally, it is apparent that the data other than the electricity amount data are collectable as the appliance data in the first embodiment. Further, it is apparent that the communication mode of the present invention may not be the electric power line but the communication that uses wireless or the like.

Furthermore, it is apparent that a communication protocol other than TCP/IP is usable in the first and second embodiments. Further, in the third embodiment a working example in which the file that holds the operation history information holds 24 hours' information by the unit of one hour is indicated but it is apparent that it is possible to hold the information in a mode other than this mode.

Moreover, in the present invention it is possible to think of a case that the electric power line communication cannot be done because of a failure of hardware, a bug of software, a noise of the electric power line and the like and it is hard to detect the cause. In the case like this, it is acceptable to construct the appliance data collecting system to execute process of a failure in data acquisition when there is no response within the predetermined time after the controller/the appliance transmits a request frame.

What is claimed is:

1. A display terminal device in an appliance data collecting system comprising: one or more appliances, the display terminal device and a control device that receive power supply from an electric power line and can communicate each other through the electric power line,
    wherein the control device collects and holds predetermined data on the appliances from the appliances regularly and without omission through the electric power line, and
    the display terminal device includes:
    a data acquisition unit that collects regularly and holds the predetermined data from the appliances;
    a non-collected data judgment unit that judges whether the non-collected data exists or not in the stored predetermined data;
    a non-collected data request unit requests the control device to transmit data on the non-collection when the non-collected data are judged to exist; and
    a data complement unit that receives and complements the data on the non-collection from the control device.

2. The display terminal device according to claim 1 further including a time measurement unit that measures passage of time and identifies the time,
    wherein the data acquisition unit further includes a collection time decision unit that decides the time to collect the predetermined data at regular intervals based on the time identified by the time measurement unit and collects the predetermined data when the decided time comes.

3. The display terminal device according to claim 2,
    wherein plural receptacles that can be connected to a plug are set on the electric power line, and
    the display terminal device further includes an detachable plug that can be connected to the receptacles set on the electric power line and receives the power supply through the plug.

4. The display terminal device according to claim 3 further including a screen display unit operable to display the predetermined data on a screen,
    wherein the data acquisition unit identifies by the time measurement unit the time when the predetermined data have been collected, associates the time with the collected predetermined data and holds the data associated with the time, and
    the screen display unit displays the predetermined data associated with the time on the screen.

5. The display terminal device according to claim 4 further including:
    a power supply detection unit operable to detect a start of the power supply; and
    a startup processing unit operable to instruct the non-collected data judgment unit to execute the judgment when the start is detected.

6. The display terminal device according to claim 4 further including:
    a first regular time detection unit operable to detect predetermined regular time to execute the judgment on the predetermined data based on the time identified by the time measurement unit; and
    a regular time processing unit operable to instruct the non-collected data judgment unit to execute the judgment when the predetermined regular time is detected.

7. The display terminal device according to claim 4 further including:
    a power supply detection unit operable to detect a start of the power supply;
    a first regular time detection unit operable to detect the predetermined regular time to execute the judgment on the predetermined data based on the time identified by the time measurement unit; and
    a startup regular time processing unit operable to instruct the non-collected data judgment unit to execute the judgment when the above-mentioned start or the predetermined regular time is detected.

8. The display terminal device according to claim 7 further including:
    a first time request unit operable to request the control device to transmit information that represents current time when the start of the power supply is detected;
    a time reception unit operable to receive information that represents time from the control device; and
    a time correction unit operable to correct the current time of the clock according to the time measurement unit based on the received information.

9. The display terminal device according to claim 7 further including:
    a second regular time detection unit operable to detect specified regular time to correct the time of the clock according to the time measurement unit based on the time identified by the time measurement unit;
    a second time request unit operable to request the control device to transmit the information that represents the current time when the specified regular time is detected;
    a time reception unit operable to receive the information that represents the time from the control device; and
    a time correction unit operable to correct the current time of the clock according to the time measurement unit based on the received information.

10. The display terminal device according to claim 7 further including:
    a second regular time detection unit operable to detect the specified regular time to correct the time of the clock according to the time measurement unit based on the time identified by the time measurement unit;

a time request unit operable to request the control device to transmit information that represents the current time when the start of the power supply or the specified regular time is detected;

the time reception unit operable to receive the information that represents the time from the control device; and the time correction unit operable to correct the current time of the clock according to the time measurement unit based on the received information.

11. The display terminal device according to claim 10 further including:

an operation history holding unit operable to receive an operation from a user and hold operation data that represents the received operation; and an operation data transmission unit operable to transmit the operation data to the control device.

12. A control device in an appliance data collecting system comprising: one or more appliances, a display terminal device and the control device that receive power supply from an electric power line and can communicate each other through the electric power line, wherein the display terminal device collects and holds predetermined data on the appliances from the appliances regularly through the electric power line, and the control device includes:

a data acquisition unit that collects and holds the predetermined data from the appliances regularly and without omission;

a data request reception unit that receives a specified request on the predetermined data from the display terminal device; and a data transmission unit that transmits the predetermined data that are held to the display terminal device based on the received request.

13. The control device according to claim 12 further including a time measurement unit operable to measure passage of time and identifies the time, wherein the data acquisition unit includes an acquisition time decision unit that decides the time to acquire the predetermined data at regular intervals based on the time identified by the time measurement unit and acquires the predetermined data when the decided time comes.

14. The control device according to claim 13 further including:

a time request reception unit operable to receive a request to transmit information that represents current time from the display terminal device; and a time transmission unit operable to identify the current time of the control device based on the time measurement unit, to generate information that represents the time and to transmit the information to the display terminal device.

15. The control device according to claim 14, wherein the appliance data collection system further comprises a center server device that is connected to the control device through a communication line, and the control device further includes:

a time transmission unit that transmits information that represents the current time of the control device identified by the time measurement unit;

a time reception unit that receives information that represents time from the center server device; and a time correction unit that corrects the current time of the clock according to the time measurement unit based on the received information.

16. A center server device in an appliance data collecting system comprising: one or more appliances, a display terminal device and a control device that receive power supply from an electric power line and can communicate each other through the electric power line, wherein the control device receives information that represents time from the center server device and corrects the built-in clock of the controller device based on the information, and the center server device includes:

a time measurement unit that measures passage of time and identifies time;

a time reception unit that receives information that represents time from the control device; and a time transmission unit that transmits information that represents current time of the center server identified by the time measurement unit.

17. An appliance data collecting system comprising: one or more appliances, a display terminal device and a control device that receive power supply from an electric power line and can communicate each other through the electric power line, wherein the display terminal device includes:

a data acquisition unit that collects regularly and holds the predetermined data from the appliances;

a non-collected data judgment unit that judges whether the non-collected data exists or not in the stored predetermined data;

a non-collected data request unit that requests the control device to transmit data on the non-collection when the non-collected data are judged to exist; and a data complement unit that receives and complements the data on the non-collection from the control device, and the control device includes:

a data acquisition unit that collects and holds the predetermined data from the appliances regularly and without omission;

a data request reception unit that receives a specified request on the predetermined data from the display terminal device; and a data transmission unit that transmits the predetermined data that are held to the display terminal device based on the received request.

18. A display method in an appliance data collecting system comprising: one or more appliances, a display terminal device and a control device that receive power supply from an electric power line and can communicate each other through the electric power line, wherein the control device collects and holds predetermined data on the appliances from the appliances regularly and without omission through the electric power line, and the display method includes:

a data acquisition step for collecting regularly and holding the predetermined data from the appliances;

a non-collected data judgment step for judging whether the non-collected data exists or not in the stored predetermined data;

a non-collected data request step for requesting the control device to transmit data on the non-collection when the non-collected data are judged to exist;

a data complement step for receiving and complementing the data on the non-collection from the control device; and a screen display step for displaying the complemented predetermined data on a screen.

19. A system control method in an appliance data collecting system comprising: one or more appliances, a display terminal device and a control device that receive power supply from an electric power line and can communicate each other through the electric power line, wherein the display terminal device collects and holds predetermined data on the appliances from the appliances regularly through the electric power line, and the system control method includes:

a data acquisition step for collecting regularly and holding the predetermined data from the appliances;

a data request reception for receiving a specified request on the predetermined data from the display terminal device; and a data transmission for transmitting the predetermined data that are held to the display terminal device based on the received request.

20. A computer program on a computer readable medium for a display terminal device in an appliance data collecting system comprising: one or more appliances, a display terminal device and a control device that receive power supply from an electric power line and can communicate each other through the electric power line, wherein the control device collects and holds predetermined data on the appliances from the appliances regularly and without omission through the electric power line, and the program includes:

a data acquisition step for collecting regularly and holding the predetermined data from the appliances;

a non-collected data judgment step for judging whether the non-collected data exists or not in the stored predetermined data;

a non-collected data request step for requesting the control device to transmit data on the non-collection when the non-collected data are judged to exist;

a data complement step for receiving and complementing the data on the non-collection from the control device; and a screen display step for displaying the complemented predetermined data on a screen.

21. A computer program on a computer readable medium for a control device in an appliance data collecting system comprising: one or more appliances, a display terminal device and a control device that receive power supply from an electric power line and can communicate each other through the electric power line, wherein the display terminal device collects and holds predetermined data on the appliances from the appliances regularly through the electric power line, and the program includes:

a data acquisition step for collecting regularly and holding the predetermined data from the appliances;

a data request reception for receiving a specified request on the predetermined data from the display terminal device; and a data transmission for transmitting the predetermined data that are held to the display terminal device based on the received request.

* * * * *